(12) United States Patent
Hastings

(10) Patent No.: US 12,450,537 B2
(45) Date of Patent: *Oct. 21, 2025

(54) SYSTEM AND METHOD FOR ALLOCATION OF RESOURCES

(71) Applicant: The Government of the United States of America, as represented by the Secretary of Homeland Security, Washington, DC (US)

(72) Inventor: William Hastings, Billings, MT (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,814

(22) Filed: Mar. 26, 2024

(65) Prior Publication Data
US 2024/0330807 A1    Oct. 3, 2024

Related U.S. Application Data

(60) Provisional application No. 63/455,127, filed on Mar. 28, 2023.

(51) Int. Cl.
| | | |
|---|---|---|
| *G06Q 10/0631* | (2023.01) | |
| *G06Q 10/0637* | (2023.01) | |
| *G06Q 30/0201* | (2023.01) | |
| *G06Q 50/40* | (2024.01) | |

(52) U.S. Cl.
CPC ... *G06Q 10/06315* (2013.01); *G06Q 10/0631* (2013.01); *G06Q 10/06312* (2013.01); *G06Q 10/06375* (2013.01); *G06Q 30/0206* (2013.01); *G06Q 50/40* (2024.01)

(58) Field of Classification Search
None
See application file for complete search history.

(56) References Cited

U.S. PATENT DOCUMENTS

| | | | |
|---|---|---|---|
| 5,832,456 | A | 11/1998 | Fox |
| 8,768,867 | B1 * | 7/2014 | Thaeler ............... G06Q 30/02 706/12 |
| 9,716,627 | B2 | 7/2017 | DeLima et al. |
| 9,779,386 | B2 | 10/2017 | Swierz, III et al. |
| 9,996,890 | B1 * | 6/2018 | Cinnamon ........... G06V 10/764 |
| 10,412,157 | B2 | 9/2019 | Thirumurthi et al. |
| 10,999,184 | B2 | 5/2021 | Sorenson, III et al. |
| 11,481,705 | B1 * | 10/2022 | Wozniak ........... G06Q 30/0205 |

(Continued)

*Primary Examiner* — Sara Grace Brown
(74) *Attorney, Agent, or Firm* — Kelly G. Hyndman; Robert W. Busby; William Washington

(57) ABSTRACT

A resource allocation system may comprise a prediction engine configured to generate a prediction record in a database and a history module configured to store a service record for a service. The resource allocation system may comprise a comparison engine configured to compare the prediction against the service records. The resource allocation system may comprise a service improvement module configured to: use the prediction record and generate a recommendation for a settings change to the resource allocation system. The resource allocation system configured to implement a change to the service to improve performance of services based on the recommendation.

30 Claims, 25 Drawing Sheets

Traffic Switch 600

| Activate or Deactivate a Sign 601 | Change Syntax on a Sign 602 | Add or Remove an Obstruction to a Pathway 603 | Remove or Create a Pathway 604 |
|---|---|---|---|
| Toggle Music On or Off 605 | Toggle a Fan On or Off 606 | Toggle a Position of a Vent or Duct 607 | Display a Discount 608 |
| | Display a Wait Time $T_E$ 609 | Display a Wait Time $T_{E+X}$ 610 | |

(56) References Cited

U.S. PATENT DOCUMENTS

| | | | |
|---|---|---|---|
| 2012/0197670 A1* | 8/2012 | Poon | G06Q 10/02 |
| | | | 705/5 |
| 2015/0262265 A1* | 9/2015 | Zamer | G06Q 30/0282 |
| | | | 705/347 |
| 2017/0178084 A1* | 6/2017 | Barreira Avegliano | |
| | | | G06Q 10/1097 |
| 2018/0247270 A1* | 8/2018 | Cronin | G06Q 10/109 |
| 2018/0268326 A1* | 9/2018 | Aoki | G05B 17/02 |
| 2018/0349808 A1* | 12/2018 | Sahadi | G06Q 10/047 |
| 2018/0375928 A1 | 12/2018 | Sorenson et al. | |
| 2019/0137979 A1* | 5/2019 | Akella | G06F 11/079 |
| 2020/0066115 A1 | 2/2020 | Sweeney | |
| 2020/0104757 A1* | 4/2020 | Molinari | G06Q 10/04 |
| 2020/0320814 A1* | 10/2020 | Hastings | G01V 5/20 |
| 2020/0410412 A1* | 12/2020 | Linguanti | A63G 27/00 |
| 2021/0063184 A1* | 3/2021 | Heinisch | G08G 1/0116 |
| 2021/0248564 A1* | 8/2021 | Sreedhara | H04N 21/25841 |
| 2022/0092442 A1 | 3/2022 | Sefair Cristancho et al. | |
| 2022/0138875 A1* | 5/2022 | Beynel | G06Q 10/025 |
| | | | 705/7.41 |
| 2022/0166884 A1* | 5/2022 | Bohannon | H04L 67/306 |
| 2022/0239605 A1* | 7/2022 | Mills | H04L 41/0895 |
| 2022/0253781 A1* | 8/2022 | Pan | G06Q 10/06375 |
| 2023/0251667 A1* | 8/2023 | Serstad | G06V 20/64 |
| | | | 701/26 |
| 2023/0419201 A1* | 12/2023 | Pachigar | H04W 64/003 |

* cited by examiner

SYSTEM AND METHOD FOR ALLOCATION OF RESOURCES

CROSS-REFERENCES

This application claims the benefit of priority to U.S. Provisional Patent Application No. 63/455,127 filed Mar. 28, 2023 incorporated by reference in its entirety.

STATEMENT OF GOVERNMENT INTEREST

The present invention was made by employees of the United States Department of Homeland Security (DHS) in the performance of their official duties. The U.S. Government has certain rights in this invention.

FIELD

Aspects of this technology relate to improving situational analysis and load balancing of resources, systems and methodologies for streamlining operations and services. Aspects of this technology provide a resource allocation system for scheduling and allocating staff and resources to improve efficiency, decrease wait times, and improve profitability and predictability of services and operations.

BACKGROUND

U.S. Pat. No. 10,412,157 incorporated by reference in its entirety provides a network apparatus for providing native load balancing within a switch.

US Patent Application Publication No. 2018/0375928 incorporated by reference in its entirety provides a distributed load balancer in which a router receives packets from at least one client and routes packet flows to multiple load balancer (LB) nodes according to a per-flow hashed multipath routing technique.

U.S. Pat. No. 10,999,184 incorporated by reference in its entirety provides a distributed load balancer in which a router receives packets from at least one client and routes packet flows to multiple load balancer nodes.

U.S. Pat. No. 9,716,627 incorporated by reference in its entirety provides a load balancer computer for configuring a load balancing program in the load balancer for a cluster of servers to dispatch client requests to the servers in the cluster.

U.S. Pat. No. 9,716,627 incorporated by reference in its entirety provides a load balancer computer for configuring a load balancing program in the load balancer for a cluster of servers to dispatch client requests to the servers in the cluster.

U.S. Pat. No. 9,779,386 incorporated by reference in its entirety provides software and a method of use for implementing workflows and managing engagements and staff.

US Patent Application Publication No. 2020/0066115 incorporated by reference in its entirety provides a system and method for distribution of product price and/or sales data in a retail establishment. Product price and/or sales data is stored locally, either in a central computer or master electronic cash register (ECR) or remotely at a master computer.

U.S. Pat. No. 5,832,456 incorporated by reference in its entirety provides a system and method for weather adapted, business performance forecasting.

SUMMARY

A resource allocation system deployable at a location is disclosed. The resource allocation system may comprise a computer containing a processor, memory and on-transitory computer readable code stored in the memory and configured to cause the processor to execute a series of instructions. The resource allocation system may comprise a prediction engine configured to generate a prediction record in a database; the prediction record comprising a prediction and associated user information. The resource allocation system may comprise a history module configured to store a service record for a service; the history module comprising a plurality of service records. The resource allocation system may comprise a comparison engine configured to compare the prediction from the prediction engine against service records from the history module. The resource allocation system may comprise a service improvement module configured to: use the prediction record of the prediction engine and generate a recommendation configured to ensure that an associated service will fall within a service benchmark. The resource allocation system configured to implement a change to the service to improve performance of services based on the recommendation.

DETAILED DESCRIPTION OF THE DRAWINGS

Resource Allocation System

Figure 1:
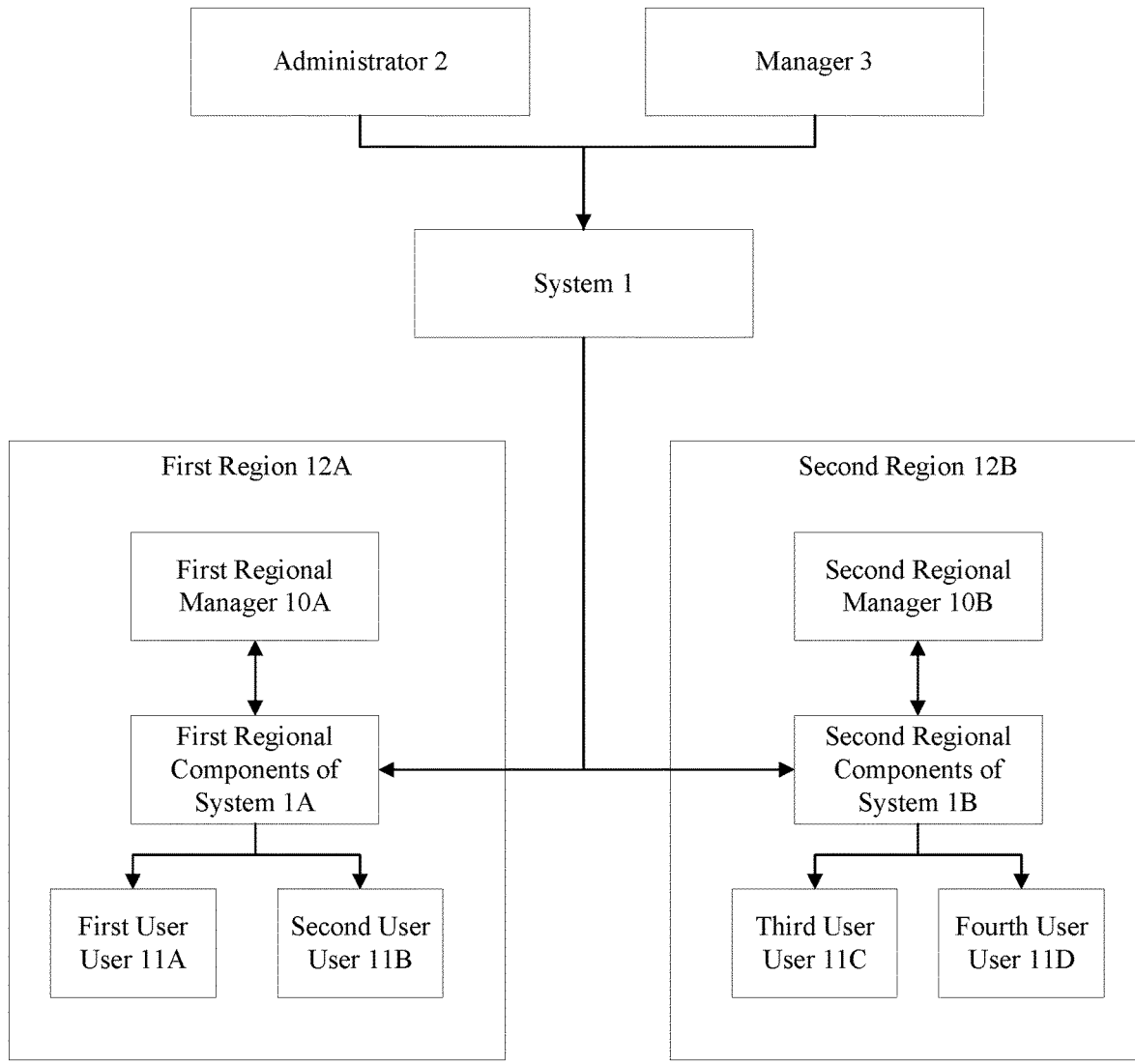
FIG. 1 illustrates a schematic diagram of the resource allocation system illustrating an exemplary configuration of subsystems.

A computer terminal may include one or more computer devices such as servers, registers, desktops, laptops, mobile phones, smart phone, wearables, calculators, etc. In general, a computer terminal requires a processor and memory with computer readable code configured to cause the process to execute a sequence of instructions. Aspects of the disclosure relate to a resource allocation system 1 configured to improve load balancing of one or more of these computer terminals.

The resource allocation system may comprise a computer. The computer can include one or more processors, memory, and non-transitory computer readable code stored in the memory. The code may be configured to cause the processor to execute a series of instructions, generate a series of modules or logic. A resource allocation system may be provided, installed, or deployed in a location such as an airport, business, store, government building, military base, etc.

In general, the resource allocation system is a machine designed to provide load balancing and optimization of performance for a service. A service may include a deliverable, action, event, or operation. For example, a service could be a dinner service, delivery service, security scan, transportation to an event, manufacture of a custom item.

The resource allocation system may be configured to make adjustments based on actual and predicted arrival time and departure times. An arrival time can be a time and date a user arrives at a first location. A departure time can be a time and date the user leaves the first location. The departure time can also be a time and date a user leaves a first location. The arrival time can be a time and date the user arrives at a second location.

The resource allocation system may be configured to analyze data and make predictions based on the analyzed data. The system may be configured to perform (take) corrective measures based on the prediction to improve a result. An improved result could be minimizing or reducing user wait time.

The resource allocation system may comprise one or more subsystems 20 such as a traffic switch, prediction engine, and equipment controller. The resource allocation system may be configured so that: a first subsystem may send instructions to a second subsystem; a first subsystem may instruct a second subsystem to process data, collect data, analyze data, and/or execute an algorithm; or a first subsystem may receive information from the second subsystem. The resource allocation system may comprise or be connected to a subsystem. A first subsystem may comprise or be connected to a second subsystem.

In some implementations, the resource allocation system may send information to a subsystem, cause the subsystem to process data, execute algorithms, send information to another system or the resource allocation system.

The resource allocation system may use these subsystems to minimize or optimize wait time, maximize value to the user, minimize cost to the user or operators of the system, minimize deviations in start time or end time of services, minimize deviations in arrival time or departure time of travel vessels, and/or maximize user satisfaction (collectively "service deliverables.")

Users

The resource allocation system 1 may be configured so that an administrator 2 can access and make changes to the system 1. An administrator may have complete or partial access to the various subsystems (like the prediction engine and fast pass platform discussed below.) The system may also provide access to a manager 3 or a regional manager (10A and 10B). The manager may have access to data and functions in the system 1 that impact one or more regions (12A and 12B). Similarly, a regional manager may have access to data and functions in the system that impact one or more regions, but a regional manager may have access to more data and functions that a manager (and/or additional access and data rights as compared to the manager). For example, a first regional manager 10A may have access to first regional components 1A of the system 1. A second regional manager 10B may have access to second regional components 1B of the system 1.

A first user 11A, second user 11B, third user 11C, and a fourth user 11D are disclosed. A user maybe someone that is in, was in, will be in, is near, was near, or will be near to a location in which the system is implemented or installed. Configurations of the invention may utilize a radius, coordinate system, electronic location detection process, or other technology to determine whether a user is, was, or will be within a specified location. Near to the system may be defined as the user or device associated with the user being within a predetermined distance away from a location associated with the system. A user may be someone that interacts with the resource allocation system (deliberately or unknowingly). The system may observe, manipulate, communicate with, monitor, react to, sell goods to, sell services to, set a schedule for, send messages to, or send alerts to a user. A customer is a type of user that visits, intends to visit, or has visited a location that sells items or services (e.g., a traveler in an airport, a diner in a restaurant, a spectator at a baseball game). A user may also be a staff person such as an employee or contractor.

User Interface

Figure 2:
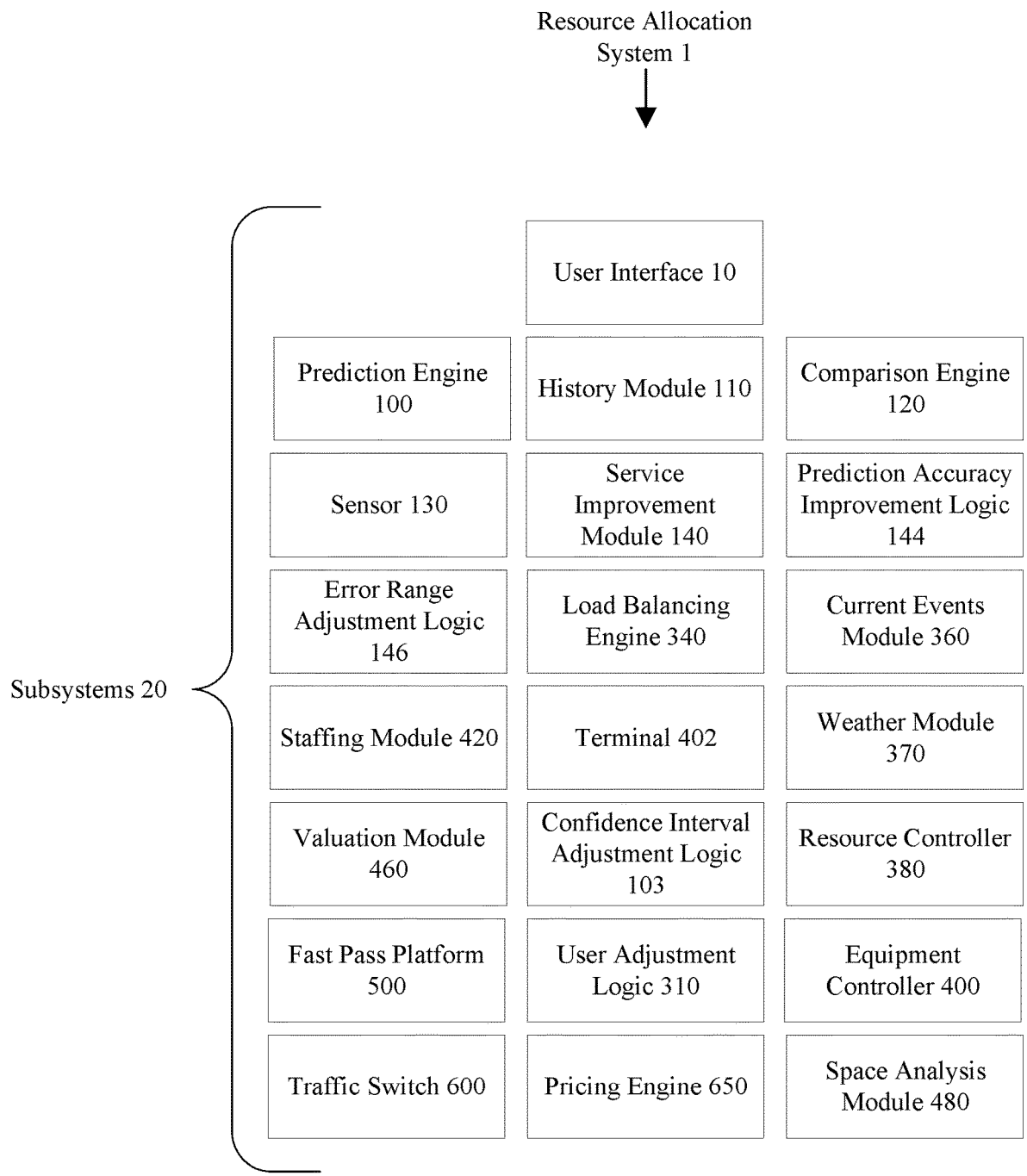
FIG. 2 illustrates a schematic diagram of the resource allocation system illustrating an exemplary configuration of subsystems.

FIG. 2, users may interact with the resource allocation system 1 and its subsystems through an interface 10. The interface may be an app on a user's mobile device, a webpage, a kiosk, buttons, etc. Users may also indirectly interface with the interface by conversing with staff who may interact with a staff interface. The interface may be designed for users, staff, administrators, managers to enter and receive data such as biographic information, biometric information, travel information, etc.

A user interface may display offers to the user. The interface may provide the user with a response function to respond to the offer. For example, the interface may be a webpage and the offer may be embodied as a webform. The webform may contain a question with possible responses presented with a drop down list. The user can respond to the offer by selecting one of the options in the drop down list and clicking a button.

A staff interface may also display notices or directions to the staff (e.g., report to booth 225 at 3:30 PM.) The interface may display staff work schedules, wait times, resource load, resource demand, resource supply, and other information to the staff. The staff interface may be configured to comprise some or all of the features of the user interface.

A manager interface may display performance information about staff as well as reports generated by the resource allocation system 1. The manager interface may provide health and performance reports about the resource allocation system. The manager interface may be configured to set threshold values for operations such as wait times. The manager interface may provide performance reports of service rates, churn rates of customers, customer value, and other data collected or generated by the resource allocation system. The manager interface may comprise an alert module configured to provide a manager (or a staff person) with data collected or processed by the resource allocation system. The manager interface may be restricted to display information about a specific region. The manager interface may be configured to comprise some or all of the staff and/or user interface functions.

An administrator interface may display performance information about the managers, staff, and users. The administrator interface may provide overall and region specific reports about services, flow rates, users, staff, and managers interfacing with the resource allocation system. The administrator interface may be configured to comprise some or all of the manager, staff, and/or user interface functions.

Environments

The resource allocation system 1 may be implemented in many different environments such as airports, restaurants, festivals, stadiums, amusements parks, stores, foods trucks, etc. In general, implementation of this system may be helpful in cases wherein: demands on a computer terminal are variable, reducing customer wait time is important, monitoring user experience is helpful, interacting with customers is useful, or improving allocation of resources is desired. A location may be a physical place or virtual place. An environment includes the location plus the resource allocation system.

Subsystems

FIG. 2, the resource allocation system may comprise one or subsystems 20 such as the following.

I) A prediction engine 100 may be configured to make a prediction how much time a particular service requires to complete (e.g., much time will be required for a service, action, or an event to be provided or completed);

II) A history module 110 may be configured store service records about a completed service. The service records may be stored in a database. The service records may comprise an event comprising event timing data. The service records may include start times of services, completion time of services, arrival time of community travel vessels, departure time of community travel vessels, wait times for users of the system on a particular date, time, and address or physical location.

III) A comparison engine 120 may be configured to compare predictions from the prediction engine 100 and service records from the history module 110. The comparison engine may be configured to determine whether predicted timing data is within a predetermined tolerance of the event timing data.

IV) A sensor 130 can be cameras, x-ray machines, radiation detectors, pressure monitor, devices for smelling or detecting particles, and other devices configured to sense or detect the presence, state, or absence of matter or energy.

V) A service improvement module configured to use the prediction records of the prediction engine 100 to generate a recommendation 134 or guidelines for a recommendation.

VI) A prediction accuracy improvement logic 144 may generate a prediction based on a feedback loop of events that transpired. The prediction accuracy improvement logic may update a prediction algorithm based on comparisons between the service records and predictions. For example, the prediction accuracy improvement logic may compare predictions of the prediction engine against service records stored in the history module.

VII) An error range adjustment logic 146 may be configured to adjust an error range for the prediction engine based on a computed variance, prediction records, and service records stored by the history module.

VIII) A terminal 402 is an electronic device (such as a computer) that provides performs functions and processes such as accounting, sales, tracking, inventory, scanning, searching, data display, data storage, etc. associated with a task for a customer or a passenger.

IX) A load balancing engine 340 may be programmed to interface with various subsystems to improve results, determine a solution, or generate an optimal solution for a load balancing problem.

X) A current events module 360 may be configured to obtain news information and adjust a prediction based on the news information.

XI) A staffing module 420 may be configured to determine staffing needs for a location at a particular time, deploy staff to a specific location, direct staff to perform a particular operation, or remove staff from a location or location.

XII) A weather module 370 may be configured to determine or receive weather conditions to improve accuracy of predictions generated by the prediction engine.

XIII) A valuation module 460 may be configured to calculate costs for a failure to meet a performance requirement.

XIV) A confidence interval adjustment logic 310 may be configured to store individual or groups of individual demands 312 on staff, space, and equipment resources.

XV) An equipment controller 400 may be configured to monitor, determine, and/or evaluate an equipment demand 390 amount for a location comprising one or more terminals.

XVI) A traffic switch 600 may be configured to direct, block, influence, or restrict users from travelling to a certain location.

XVII) A pricing engine 650 may be configured to adjust pricing of a particular service based on feedback from the resource controller.

XVIII) A space analysis module 480 may be configured to change store layouts, adjust access pathways, and/or activate or deactivate kiosks to change how many people will be in a particular area at a time.

Predictions

Figure 3:
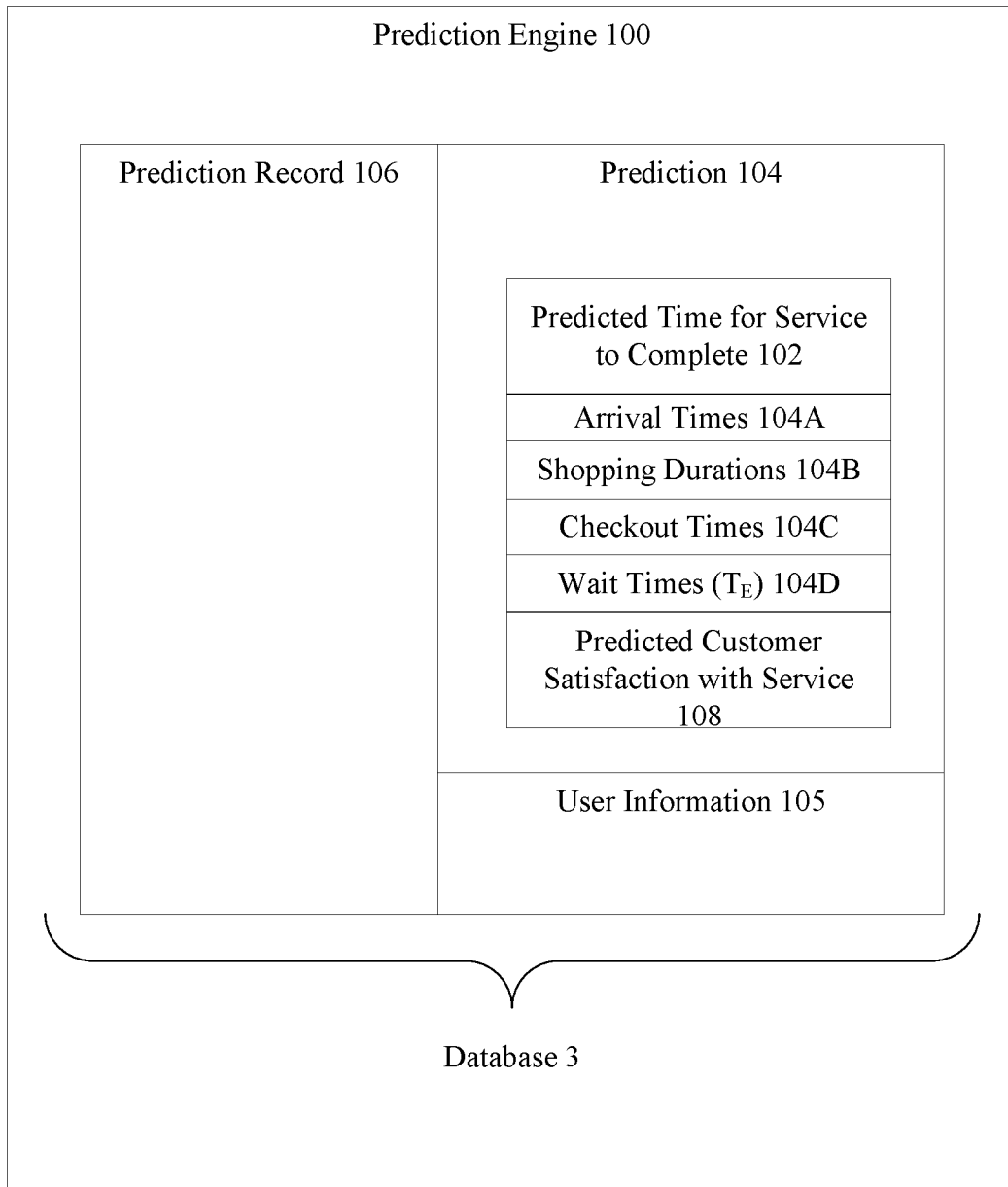
FIG. 3 illustrates a schematic diagram of the prediction engine.

Referring to FIG. 2 and FIG. 3, a resource allocation system 1 may comprise a prediction engine 100 configured to make a prediction concerning how much time will be required for a service, action, or an event to be provided or completed 102. The prediction engine 100 may be configured to make a prediction 104 concerning what time a service deliverable, action, or event will occur or how much a customer will enjoy or dislike a service. A prediction may include how much supplies or inventory will be needed (and how long those supplies are predicted to last) for a service, action, or event. The prediction engine may store the prediction 104 in a prediction record 106 in a database 3. The prediction record may comprise the prediction and associated user information 105. Predictions may include arrival and departure times of travel vessels 104A, shopping durations 104B, checkout times for customers 104C, one or more wait times 104D for a user optionally engaged in travel, spectating, or shopping.

Service Records and History Module

In some configurations, the resource allocation system may comprise a history module 110. The history module may be configured store service records in a database 3 of start times of services, completion time of services, arrival time of community travel vessels, departure time of community travel vessels, wait times for users of the systems on particular dates, times, and locations. The history module may store actual wait times for the users as well as predicted wait times generated by the prediction engine.

The system may comprise a single database or a plurality of databases. In the configuration show, there is a single database that stores both service records and prediction records. A database is a computer that stores data in records, comprises a processor, and specialized software for managing the database. Databases may be constructed with varying implementations such as a distributed database, centralized database, relational database, operational database, hierarchical database, cloud database, object oriented database, etc.

Figure 4:
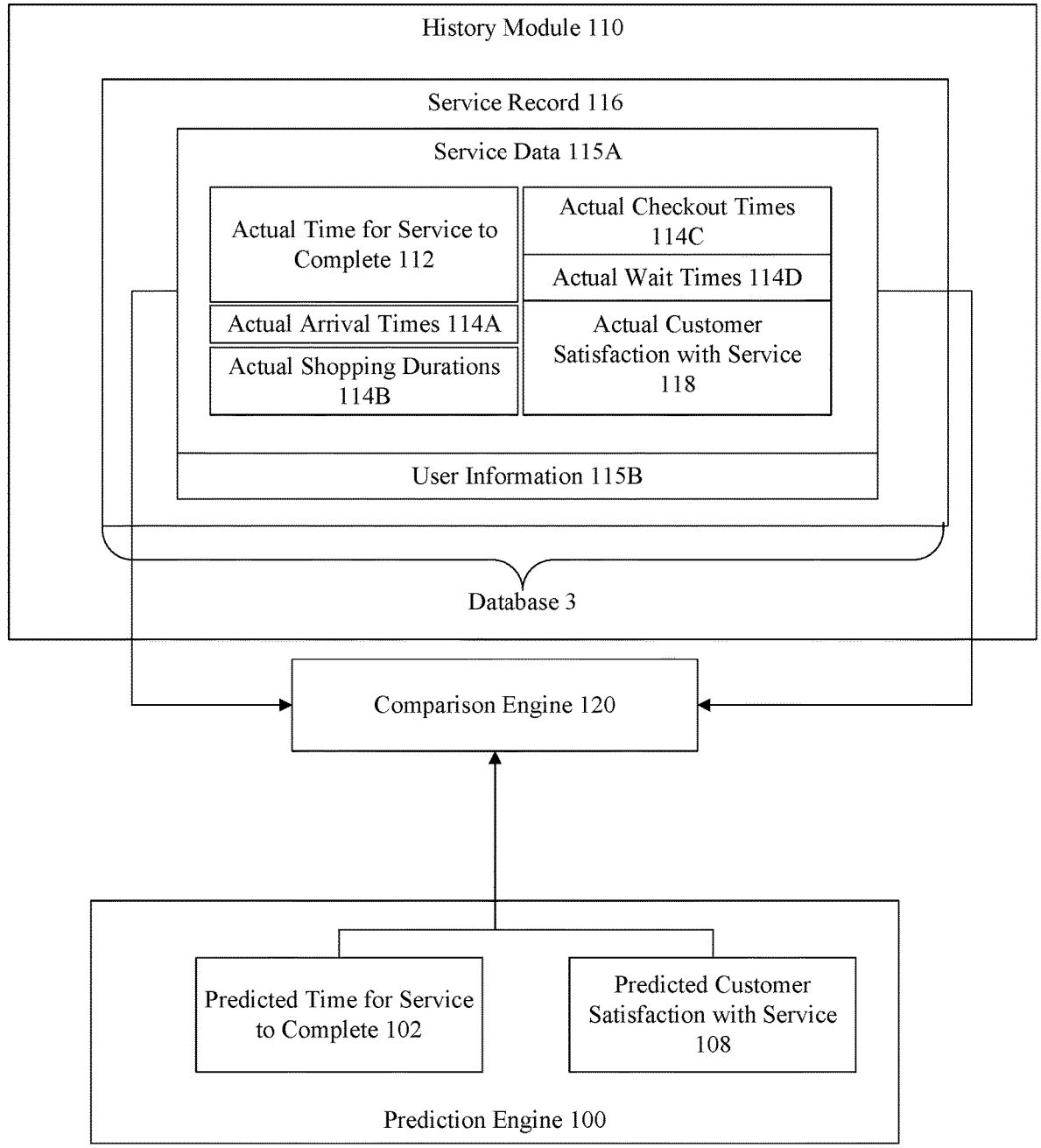
FIG. 4 illustrates a schematic diagram of the history module.

In FIG. 3 and FIG. 4, the history module may be configured to store a customer satisfaction report about how much a customer enjoyed a service. The history module may be configured to store a time that a travel vessel arrived at a destination. The history module may be configured to generate a service record to store how much a customer enjoys that service, or at what time a travel vessel actually arrived. The history module engine may be configured to record how long a service, action, or event took to deliver 112 or how much a customer enjoyed or disliked a service 118. The history module may store that data in a service record 116. The service record may comprise service data 115A and user information 115B associated with the service data 115A. The user information 105 may or may not correspond to the same user as the user information from the service record. Service records may include arrival and departure times of travel vessels 114A, shopping durations 114B, checkout times for customers 114C, one or more wait times 114D for a user optionally engaged in travel, spectating, or shopping.

Comparison Engine

FIG. 4, a comparison engine 120 (which made be a component of the prediction engine 100 or history module 100 in some configurations) may be configured to compare predictions 104 from the prediction engine 100 against service records 116 from the history module 110. For example, the comparison engine may compare a predicted customer satisfaction record 106 against an actual customer satisfaction record 118 to determine whether they are the same, within a predetermined tolerance (e.g. +/−10%), or whether the difference between the values is below a predetermined threshold (e.g., difference in time is predicted wait vs actual wait time is less than five minutes.)

Sensors

Figure 5:
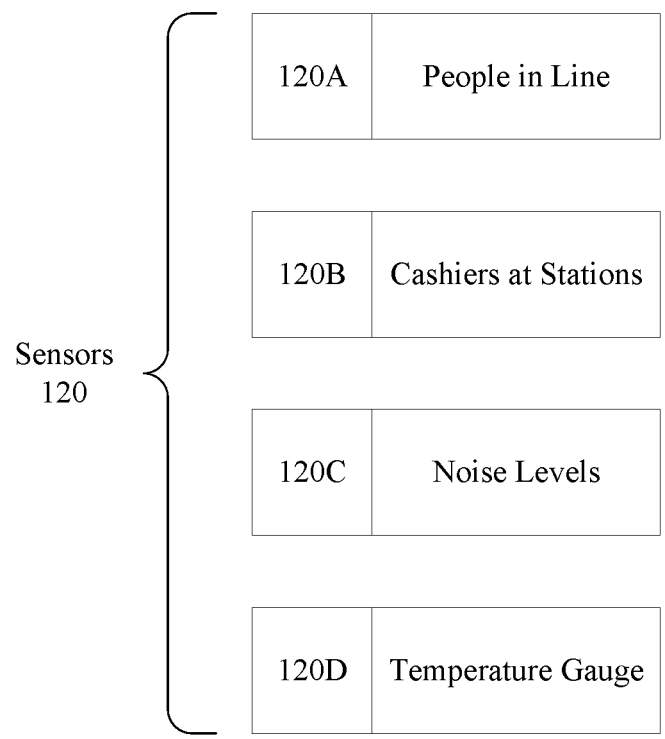
FIG. 5 illustrates a schematic diagram of a sensor.

FIG. 5 shows examples of sensors 130. The resource allocation system may comprise a sensor network comprising one or more sensors. For example, the sensor network may comprise a personnel sensor 120A configured to count how many people are standing in a line or are in a specific area. The sensor network may comprise an employee sensor 120B configured to count how many employees are working at specific stations such as their desk or a cash register. A sound sensor may be configured to determine a sound level at a specific location and time. The sound sensor 120C may be configured to determine average sound levels, changes in sound levels, detect certain types of sounds (such as the sound of breaking glass), or process spoken commands or words. A temperature gauge 120D may be configured to determine the temperature in a location, change in temperature, and temperature averages for a location over a period of time. The subsystems 20 may comprise one or more sensors. Sensors can be cameras, x-ray machines, radiation detectors, pressure monitor, devices for smelling or detecting particles, and other devices configured to sense or detect the presence, state, or absence of matter or energy.

For example, a grocery store implementing a configuration of the present invention might install cameras. The sensors may be configured to detect how many people are within a location at a specified time. The resource allocation system might be configured to receive data from the cameras to determine how many cashiers are at their stations, how many people are waiting to checkout, etc. The resource allocation system may also comprise a noise level monitor for detecting noise levels and a temperature gauge for determining freezer temperatures.

Service Improvement Module

Figure 6:
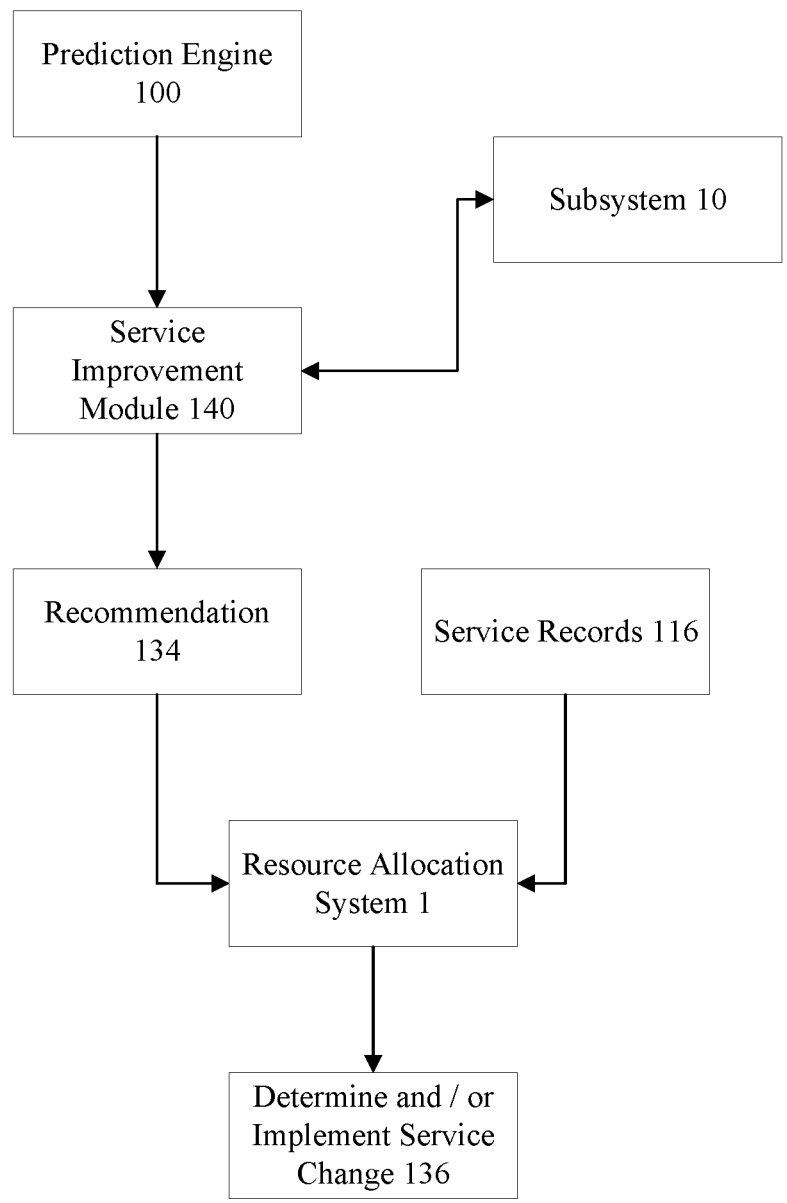
FIG. 6 illustrates a process flow between the resource allocation system and the prediction engine.

FIG. 6, the system may comprise a service improvement module 140 configured to use the prediction records of the prediction engine 100 and/or the service records of the history module. The service improvement module 140 may be configured to generate a recommendation 134 or guidelines for a recommendation. The resource allocation system 1 may be configured to analyze the recommendations in order determine and/or implement a change to services 136 to improve performance of services (e.g., to ensure that actual service records fall within service benchmarks or service predictions). The service improvement module 140 may be configured to interact with one or more of the subsystems 10 (staffing module, space analysis module, traffic switch, etc.) to generate its recommendation. The resource allocation system 1 may be configured to analyze service records 116 to determine and/or implement a service change 136.

Figure 7:
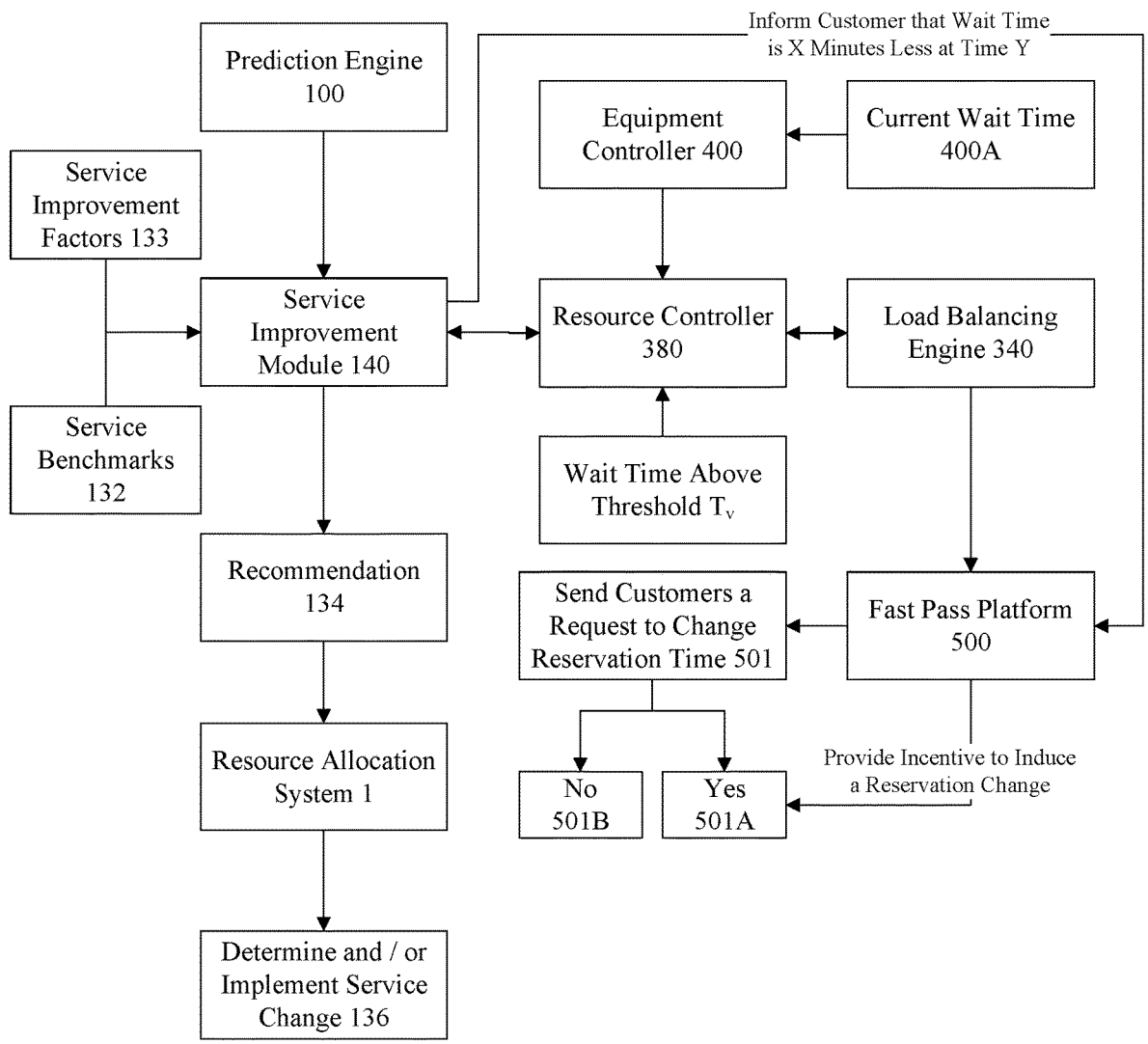
FIG. 7 illustrates a process flow involving the resource controller, fast pass platform, equipment controller and resource allocation system.

FIG. 7 illustrates an exemplary process flow. The equipment controller 400 may be configured to determine a current customer wait time 400A. For example, when a resource controller 380 may be configured to determine that there will be an expected wait time at a restaurant exceeds threshold value $T_v$, the system may invoke the load balancing engine 340 to determine possible changes to make to the resource allocation system 1. The load balancing engine 340 may be configured to invoke or communicate with the fast pass platform 500, for example, to send customers an invitation to change their reservation to an earlier time in exchange for an incentive, benefit, gift, etc. The service improvement module may be configured to request the fast pass platform to send a notification to a customer that a first expected wait time when the customer comes at an earlier time will be fewer minutes than a second expected wait time when the customer comes at a currently reserved time. For example, the service improvement module 140 may be configured to request the fast pass platform 500 to send a notification to a customer that the expected wait time when the customer comes an hour earlier will be 10 minutes versus 30 minutes when the customer comes at the currently reserved time (or current time). The fast pass platform 500 may send a customer a request to change a reservation time 501. The fast pass platform may be configured to receive a positive response or negative response from the customer in exchange for the incentive. The customer may send a positive response 501A or negative response 501B in exchange for a possible reward or incentive. The resource allocation system may be configured to provide the incentive to the customer and adjust the customer's reservation time.

The service improvement module may be configured to receive a prediction from the prediction engine 100 such as how long a specific service is expected to take. The service improvement module 140 may analyze or weigh various service improvement factors 133 in order to compute an improved or optimized solution (a recommendation 134) so that the resource allocation system 1 can reduce the customer wait time. Service improvement factors 133 may include cost, customer satisfaction, customer irritation, staffing cost, staffing irritation, staffing satisfaction, results certainty, past offers, and other options in order to arrive an improved or optimized solution. Service benchmarks 132 may include a scoring or rating of system or staff performance for these factors. The resource allocation system 1 may be configured to implement the service change 136.

Prediction Engine

Figure 8:
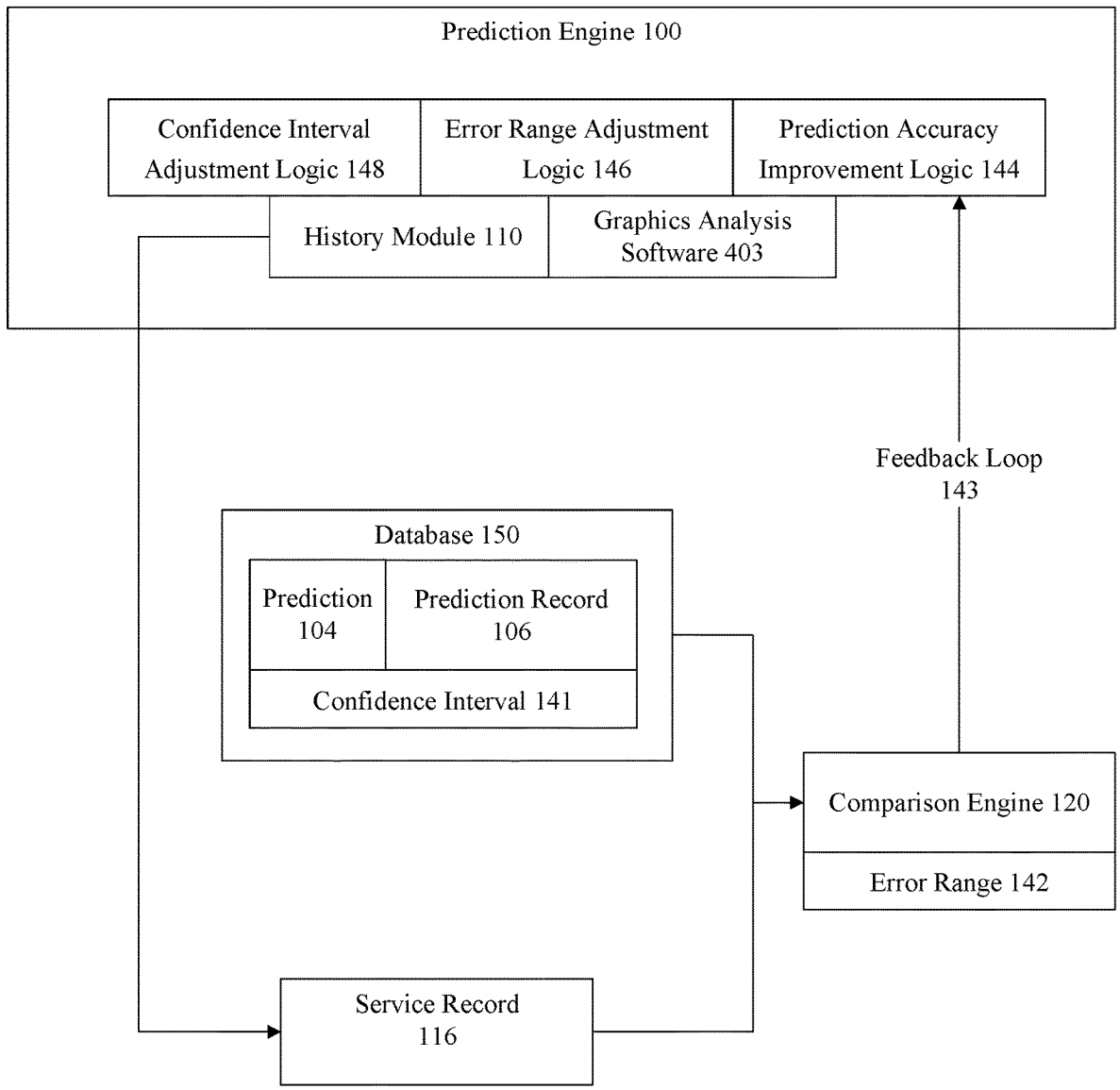
FIG. 8 illustrates a schematic diagram of the comparison engine, prediction engine, and database.

In FIG. 8, the system may comprise or generate a prediction engine 100 configured to generate predictions 104. The prediction engine 100 may be configured to generate a confidence interval indicating a likelihood that a prediction will match timing associated with a service record (e.g., actual wait time matches predicted wait time.) The prediction engine may comprise confidence interval logic 103 configured to generate the confidence interval. The prediction may comprise the confidence interval 141. The matching may be done using an error range 142. For example, the prediction engine 100 may determine the predicted wait time at a restaurant is 45 minutes. The prediction engine may also calculate a 90% confidence interval that the actual wait time will be 45 minutes+/−10 minutes. The prediction engine may comprise one or more subsystems for updating its predictions. For example, the prediction engine may comprise a history module 110, prediction accuracy improvement logic 144, error range adjustment logic 146, and confidence interval adjustment logic 148. The prediction engine may comprise a database 150 for storing a history of its predictions, events, and/or event timing. In some configurations, the history module 110 may be configured to store the predictions, events, and/or event timing. The prediction engine may use graphics analysis software 403 to assist in generating predictions.

Prediction Accuracy Improvement Logic

FIG. 8 shows a prediction engine comprising a confidence interval adjustment logic 148, error range adjustment logic 146, prediction accuracy improvement logic 144, history module 110, and a database 150. The prediction engine may generate a prediction record 106 and a confidence interval 141 about an error range associated with the prediction record. A comparison engine 120 may be configured to compare the prediction record 106 to a service record 116 to determine an error range 142 (e.g., a measurement of how close the prediction record was to the service record.) A feedback loop 143 from the comparison engine 120 to prediction engine 100 is configured to provide the prediction engine with additional data that its prediction accuracy improvement logic 144 can use to improve the accuracy of a prediction 104.

The resource allocation system or the prediction engine may comprise the confidence interval adjustment logic. The confidence interval adjustment logic may be configured to generate a confidence interval about an error range associated with a prediction record. The comparison engine may be configured to compare the prediction record to the service record to determine an error range. The feedback loop from the comparison engine to the prediction engine may be configured to provide the prediction engine with comparison data. The error range adjustment logic may be configured to adjust an error range of a future prediction based on the comparison data. The prediction accuracy improvement logic may be configured to use the comparison data to improve accuracy of future predictions.

Figure 9:
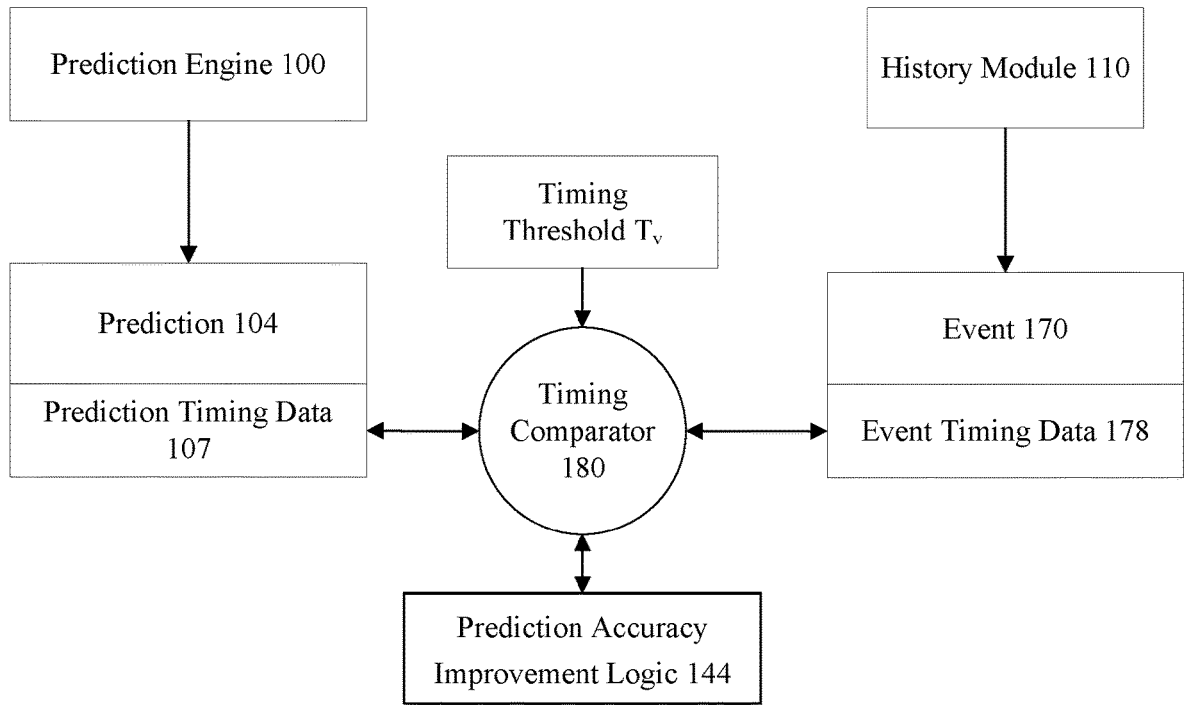
FIG. 9 illustrates a schematic diagram of the timing comparator, prediction accuracy improvement logic, prediction timing element and event timing element.

In FIG. 9, the prediction engine 100 may generate a prediction 104 having a prediction timing element 107 associated with an actual event 170 (which may contain an event timing 178). A timing comparator 180 may determine whether the prediction is accurate by determining whether the timing of the prediction matches the event timing within an error range or threshold. A prediction accuracy improvement logic 144 may generate the predictions based on a feedback loop of events that transpired. The prediction accuracy improvement logic may update a prediction algorithm based on comparisons between the service records and predictions. For example, the prediction accuracy improvement logic may compare predictions of the prediction engine against service records stored in the history module. Based on this comparison, the prediction accuracy improvement logic may adjust its prediction(s) using the service record(s) as a guide for making those adjustments.

The prediction engine may be configured to:
I) generate a prediction comprising a predicted start time of the service and a predicted end time of the service;
II) calculate an average of actual start times for the service based on service records from the history module;
III) calculate an average of predicted start times for the service based on prediction records from the prediction engine;
IV) calculate an average of actual completion times for the service based on service records from the history module;
V) calculate an average of predicted completion times for the service based on prediction records from the prediction engine;
VI) generate a predicted wait time of the service;
VII) generate a predicted arrival time of the service;
VIII) generate a predicted start time of the service;
IX) generate a predicted completion time of the service;
X) calculate an average of predicted wait times of the service based on multiple occurrences of the service;
XI) calculate an average of predicted arrival times of the service based on multiple occurrences of the service; and/or
XII) calculate an average of predicted start times of the service based on multiple occurrences of the service.

The history module may be configured to:
I) generate service records; the service records comprising a service and associated user information;
II) record an actual wait time of the service;
III) record an actual arrival time of the service;
IV) record an actual start time of the service;
V) record an actual competition time of the service;

VI) calculate an average of actual wait times of the service based on multiple occurrences of the service;

VII) calculate an average of actual arrival times of the service based on multiple occurrences of the service;

VIII) calculate an average of start times of the service based on multiple occurrences of the service; and/or IX) calculate an average of competition times of the service based on multiple occurrences of the service.

Figure 10:
FIG. 10 illustrates exemplary logic pathways of the prediction accuracy improvement logic.

FIG. 10, the prediction accuracy improvement logic 144 may comprise various logic pathways. For example, the prediction accuracy improvement logic 144 may be configured to:

I) adjust the predicted start time of a service to a later time if an average of actual start times for the service was later than an average of predicted start times for the service 201A;

II) adjust the predicted start time of a service to an earlier time 202B if an average of actual start times for the service was earlier than an average of predicted start times for the service 202A;

III) adjust the predicted completion time of the service to a later time 203B if an average of the actual completion times for the service was later than the average of predicted completion times for the service 203A;

IV) adjust the predicted completion time of services to an earlier time 204B if the average of actual completion times for the service was earlier than the average of the predicted completion times for the service 204A;

V) increase the predicted wait time 205B if the actual wait time was longer than the predicted wait time 205A;

VI) decrease the predicted wait time 206B if the actual wait time was shorter than the predicted wait time 206A;

VII) adjust the predicted arrival time to a later time 207B if an average of actual arrival times was later than an average of predicted arrival times 207A;

VIII) adjust the predicted arrival time to an earlier time 208B if an average of actual arrival times was earlier than an average of predicted arrival times 208A;

IX) adjust the predicted departure time to a later time later 209B if an average of actual departure times was later than an average of predicted departure times 209A;

X) adjust the predicted departure time to a later time 210B earlier if an average of actual departure times was earlier than an average of predicted departure times 210A;

XI) adjust the predicted start time of services to a later time if the average of actual start times for a service was later than the average of predicted start times for the service 211A;

XII) adjust the predicted start time of services to an earlier time 212B if the average of actual start times for a service was earlier than the average of predicted start times for a service 212A;

XIII) adjust the predicted completion time of services to a later time 213B if an average of actual completion times for a service was later than an average of predicted completion times for a service 213A; and/or XIV) adjust the predicted completion time of services to an earlier time 214B if an average of actual completion times for a service was earlier than an average of predicted completion times for a service 214A.

Error Range Adjustment Logic

Figure 11:
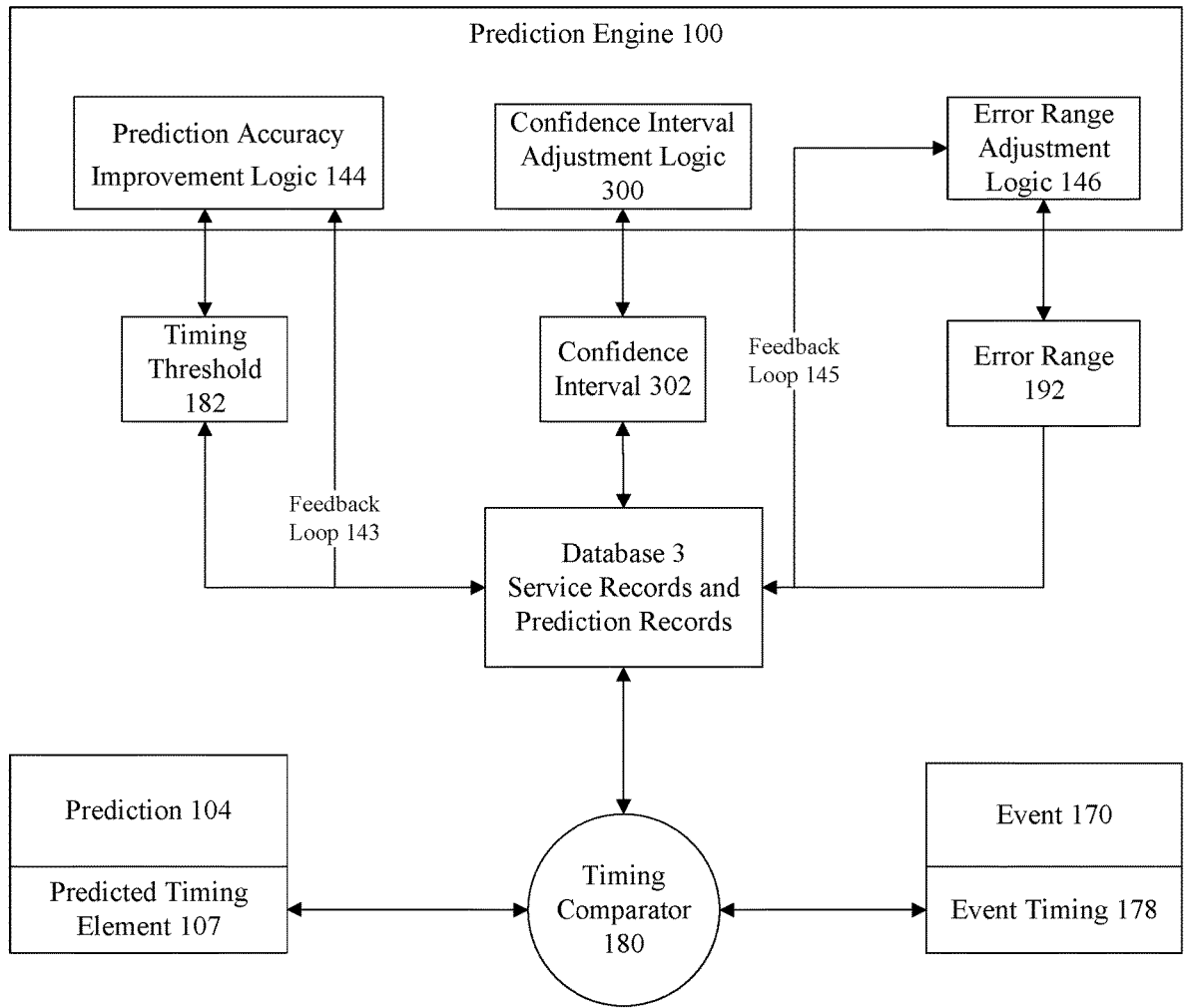
FIG. 11 illustrates interactions between the prediction accuracy improvement logic, confidence interval adjustment logic, and error range adjustment logic.
Figure 12:
FIG. 12 illustrates exemplary logic pathways of the error range adjustment logic.

FIG. 11 and FIG. 12 show an error range adjustment logic 146 may generate an error range 192 to indicate a range of predicted values in which an actual event can occur. The prediction accuracy improvement logic 144 (or timing comparator 180) may consider event timing 178 associated with an actual event 170 to match a predicted timing data 105 associated with a prediction 104 for the predicted event when the event timing 178 associated with the actual events 170 is within the error range 192 or threshold value $T_V$.

As an example, a resource allocation system comprising a computer containing a processor, memory and on-transitory computer readable code stored in the memory and configured to cause the processor to execute a series of instructions may be provided. The resource allocation system may comprise an error range adjustment logic configured to generate an error range indicating a range of predicted values in which an actual service can occur; a history module may be configured to store service timing data for the actual service; and a prediction engine may be configured to generate a prediction comprising timing data.

The prediction accuracy improvement logic configured to: determine a difference between event timing data associated with the actual event with predicted timing data associated with the first prediction; determine a timing match when the event timing data is within a threshold value $T_V$; determine a timing non-match when the event timing data is outside a threshold value $T_V$; update the prediction generation algorithm based on whether a timing match or timing non-match was determined; and the prediction engine may be configured to generate a second prediction having more accurate event timing data.

The prediction accuracy improvement logic may be configured to: receive service record information from the history module through a feedback loop; compute a variance between the prediction records stored by the prediction module and services records; and adjust the predicted error range based on the variance. The prediction engine may be configured to generate a second prediction having a more accurate error range.

The prediction accuracy improvement logic may be configured to: determine a difference between event timing data associated with the actual event with predicted timing data associated with the first prediction; determine a timing match when the event timing data is within a threshold value TV; determine a timing non-match when the event timing data is outside a threshold value TV; and update the prediction generation algorithm based on whether a timing match or timing non-match was determined. The prediction engine may be configured to generate a second prediction having more accurate event timing data.

FIG. 11 and FIG. 12, the error range adjustment logic 146 may adjust the error range based on a feedback loop 145. The timing comparator 180 may determine a variance between event timing 178 and the prediction timing 107 (e.g., an absolute value of event timing minus prediction timing.) The error range adjustment logic 146 may adjust its error range 192 based on the variance, prediction records 106 of the prediction engine, and service records 116 stored by the history module 100. Based on this comparison, the error range adjustment logic 146 may adjust its predictions using the service records as a guide for making those adjustments.

In some configurations, the resource allocation system comprises: a history module configured to store service timing data for the actual service; record an actual start time for the service; and record an actual competition time for the service. The prediction engine may comprise a prediction generation algorithm configured to generate: a predicted start time of the service; and a predicted completion time of the service. The error range adjustment logic may be configured to generate an error range indicating a range of predicted values in which an actual service can occur. The error range adjustment logic may be configured to: generate a first error range of a predicted completion time of the service; calculate an average time difference between actual start time and predicted start time of the service; adjust the first error range of the predicted start time of the service to a smaller range if the average time difference between actual start time and predicted start time is less than a first threshold value; adjust the first error range of the predicted start time of the service to a larger range if the average time difference between actual start time and predicted start time is greater than the first threshold value; adjust the first error range of a predicted completion time of the service to a smaller range if an average time difference between the actual completion time and the predicted completion time is less than a second threshold value; and adjust the first error range of a predicted completion time of services to a larger range if an average time difference between actual start times and predicted completion times is greater than the second threshold value. The prediction engine may be configured to: generate a second prediction containing a second error range of the predicted start time of the service; the second error range may be more accurate that the first error range; and generate a second prediction containing a second error range of the predicted competition start time of the service; the second error range may be more accurate that the first error range.

A resource allocation system may be configured to comprise a prediction engine configured to generate a predicted arrival time of a first user; a history module configured to record an actual arrival time of the first user. An error range adjustment logic may be configured to: generate an error range of the predicted arrival time of the first user based on past arrival times recorded by the history module; calculate an average time difference between actual arrival times of the first user and predicted arrival times of the first user; adjust the error range of the predicted arrival time of the first user to a smaller range if the average time difference between actual arrival times and predicted arrival times is less than a threshold value; adjust the error range of a predicted arrival time to a greater range if the average time difference between actual arrival times and predicted arrival times is greater than the threshold value. The prediction engine may be configured to generate a second prediction containing a second error range of the predicted arrival time of the first user; the second error range more accurate that the first error range.

FIG. 12, the error range adjustment logic 146 may be configured to:

I) Adjust the error range of a predicted start time of services to a smaller range 221B if an average time difference between actual start times and predicted start times is less than a first threshold value 221A;

II) Adjust the error range of a predicted start time of services to a larger range 222B if an average time difference between actual start times and predicted start times is greater than the first threshold value 222A;

III) Adjust the error range of a predicted completion time of services to a smaller range 223B if an average time difference between actual completion times and predicted completion times is less than a second threshold value 223A;

IV) Adjust the error range of a predicted completion time of services to a larger range 224B if an average time difference between actual completion times and predicted completion times is greater than the second threshold value 224A;

V) Adjust the error range of a predicted wait time of services to a smaller range 225B if an average time difference between actual start times and predicted wait times is less than a threshold value 225A;

VI) Adjust the error range of a predicted wait time of services to a greater range 226B if an average time difference between actual wait time and predicted wait times is greater than a threshold value 226A;

VII) Adjust the error range of a predicted arrival time to a smaller range 227B if an average time difference between actual arrival times and predicted arrival times is less than a threshold value 227A;

VIII) Adjust the error range of a predicted arrival time to a greater range 228B if an average time difference between actual arrival times and predicted arrival times is greater than a threshold value 228A;

IX) Adjust the error range of a predicted departure time to a smaller range 229B if an average time difference between actual departure times and predicted departure times is less than a threshold value 229A;

X) Adjust the error range of a predicted departure time to a greater range 230B if an average time difference between actual departure times and predicted departure times is greater than a threshold value 230A;

XI) Adjust the error range of a predicted start time of services to a smaller range 231B if an average of actual start times for a service is less than an average of predicted start times for a service 231A;

XII) Adjust the error range of a predicted start time of services to a greater range 232B if an average of actual start times for a service is greater than an average of predicted start times for a service 232A;

XIII) Adjust the predicted completion time of services to an earlier time 233B if an average of actual completion times for a service was earlier than an average of predicted completion times for a service 233A; and/or XIV) Adjust the predicted completion time of services to a greater time 234B if an average of actual completion times for a service was greater than an average of predicted completion times for a service 234A.

Confidence Interval Adjustment Logic

Figure 13:
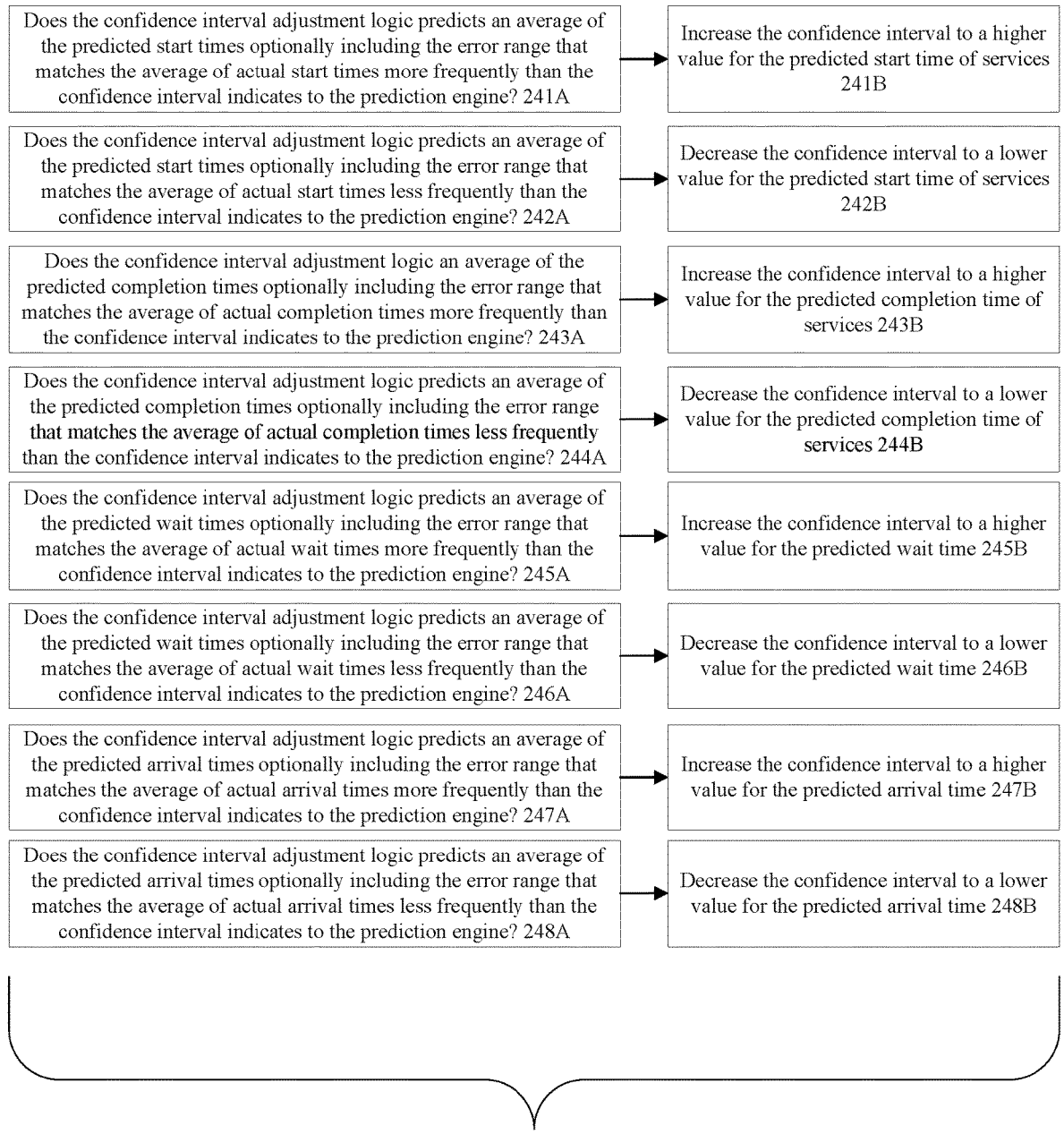
FIG. 13 illustrates a first portion of logic pathways of the confidence interval adjustment logic.
Figure 14:
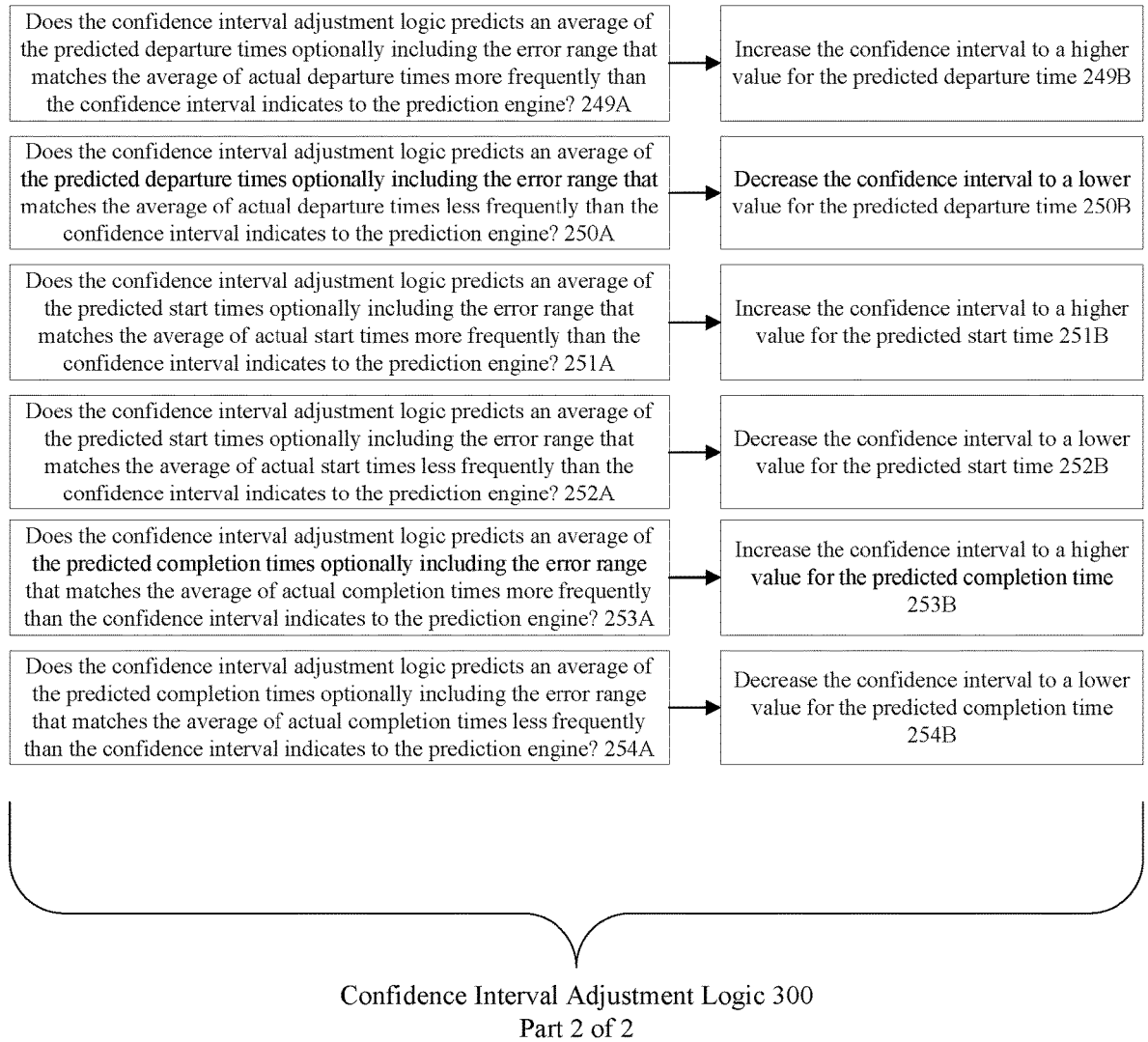
FIG. 14 illustrates a second portion of logic pathways of the confidence interval adjustment logic.

FIG. 13 and FIG. 14 show the system 1 may comprise a confidence interval adjustment logic 300 configured to determine and/or adjust a confidence interval 302. The confidential interval 302 may indicate a likelihood or probability that a prediction matches (e.g., is the same or within the error range) timing associated with actual event. The confidence interval adjustment logic 300 may adjust the confidence interval based on a feedback loop of events that transpired. The confidence interval adjustment logic may compare the predictions of the prediction engine against the service records stored in the history module. Based on this comparison, the prediction engine may adjust its predictions using the service records as a guide for making those adjustments.

For example, a resource allocation system comprising a computer containing a processor, memory and on-transitory computer readable code stored in the memory and configured to cause the processor to execute a series of instructions may be provided. The system may comprise: a prediction engine configured to: generate a first prediction comprising a predicted start time and a confidence interval; and store a plurality of predictions in a first database. The system may comprise a history module configured to: record an actual start time associated with an actual service; and store the actual start time in a second database comprising a plurality of service records; calculate an average of actual start times of the service. A confidence interval adjustment logic configured to: determine a confidence interval; the confidential interval indicating a likelihood or probability that the prediction matches, within an error range, timing data associated with the actual service; calculate an average of the predicted start times including the error range; adjust the confidence interval based on a feedback loop of previous services; compare the predictions of the prediction engine against the service records stored in the history module; and generate an adjusted confidence interval based on the comparison. The prediction engine configured to generate a second prediction comprising the adjusted confidence interval.

The resource allocation system may comprise confidence interval adjustment logic further configured to: increase the confidence interval to a higher value for the predicted start time of the service when the confidence interval adjustment logic determines the average of the predicted start times including the error range matches the average of actual start time with a higher frequency than indicated by the confidence interval; and decrease the confidence interval to a lower value for the predicted start time of the service when the confidence interval adjustment logic determines the average of the predicted start times including the error range matches the average of actual start time with a lower frequency than indicated by the confidence interval.

The resource allocation system may be configured wherein the first prediction of the prediction engine further comprises a predicted completion time; the prediction engine is configured to calculate an average of the predicted completion times; and the history module is configured to calculate an average of actual completion times. The confidence interval adjustment logic may be configured to: increase the confidence interval to a higher value for the predicted completion time of services when the confidence interval adjustment logic determines the average of the predicted completion times including the error range matches the average of actual completion times more frequently than the confidence interval indicates to the prediction engine; and decrease the confidence interval to a lower value for the predicted completion time of services when the confidence interval adjustment logic determines the average of the predicted completion times including the error range matches the average of actual completion times less frequently than the confidence interval indicates to the prediction engine.

Additional configurations of the resource allocation system are contemplated. For example, the confidence interval adjustment logic may:

I) Increase the confidence interval to a higher value for the predicted start time of services 241B when the confidence interval adjustment logic determines an average of the predicted start times optionally including the error range matches the average of actual start times with a frequency higher than indicated to prediction engine by the confidence interval 241A;

II) Decrease the confidence interval to a lower value for the predicted start time of services 242B when the confidence interval adjustment logic determines an average of the predicted start times optionally including the error range matches the average of actual start times less frequently than the confidence interval indicates to the prediction engine 242A;

III) Increase the confidence interval to a higher value for the predicted completion time of services 243B when the confidence interval adjustment logic determines an average of the predicted completion times optionally including the error range matches the average of actual completion times more frequently than the confidence interval indicates to the prediction engine 243A;

IV) Decrease the confidence interval to a lower value for the predicted completion time of services 244B when the confidence interval adjustment logic predicts an average of the predicted completion times optionally including the error range matches the average of actual completion times less frequently than the confidence interval indicates to the prediction engine 244A;

V) Increase the confidence interval to a higher value for the predicted wait time 245B when the confidence interval adjustment logic predicts an average of the predicted wait times optionally including the error range matches the average of actual wait times more frequently than the confidence interval indicates to the prediction engine 245A;

VI) Decrease the confidence interval to a lower value for the predicted wait time 246B when the confidence interval adjustment logic predicts an average of the predicted wait times optionally including the error range matches the average of actual wait times less frequently than the confidence interval indicates to the prediction engine 246A;

VII) Increase the confidence interval to a higher value for the predicted arrival time 247B when the confidence interval adjustment logic predicts an average of the predicted arrival times optionally including the error range matches the average of actual arrival times more frequently than the confidence interval indicates to the prediction engine 247A;

VIII) Decrease the confidence interval to a lower value for the predicted arrival time 248B when the confidence interval adjustment logic predicts an average of the predicted arrival times optionally including the error range matches the average of actual arrival times less frequently than the confidence interval indicates to the prediction engine 248A;

IX) Increase the confidence interval to a higher value for the predicted departure time 249B when the confidence interval adjustment logic predicts an average of the predicted departure times optionally including the error range matches the average of actual departure times more frequently than the confidence interval indicates to the prediction engine 249A;

X) Decrease the confidence interval to a lower value for the predicted departure time 250B when the confidence interval adjustment logic predicts an average of the predicted departure times optionally including the error range matches the average of actual departure times less frequently than the confidence interval indicates to the prediction engine 250A;

XI) Increase the confidence interval to a higher value for the predicted start time 251B when the confidence interval adjustment logic predicts an average of the predicted start times optionally including the error range matches the average of actual start times more frequently than the confidence interval indicates to the prediction engine 251A;

XII) Decrease the confidence interval to a lower value for the predicted start time 252B when the confidence interval adjustment logic predicts an average of the predicted start times optionally including the error range matches the average of actual start times less frequently than the confidence interval indicates to the prediction engine 252A;

XIII) Increase the confidence interval to a higher value for the predicted completion time 253B when the confidence interval adjustment logic predicts an average of the predicted completion times optionally including the error range matches the average of actual completion times more frequently than the confidence interval indicates to the prediction engine 253A; and/or XIV) Decrease the confidence interval to a lower value for the predicted completion time 254B when the confidence interval adjustment logic predicts an average of the predicted completion times optionally including the error range matches the average of actual completion times less frequently than the confidence interval indicates to the prediction engine 254A.

User Adjustment Logic

Figure 15:
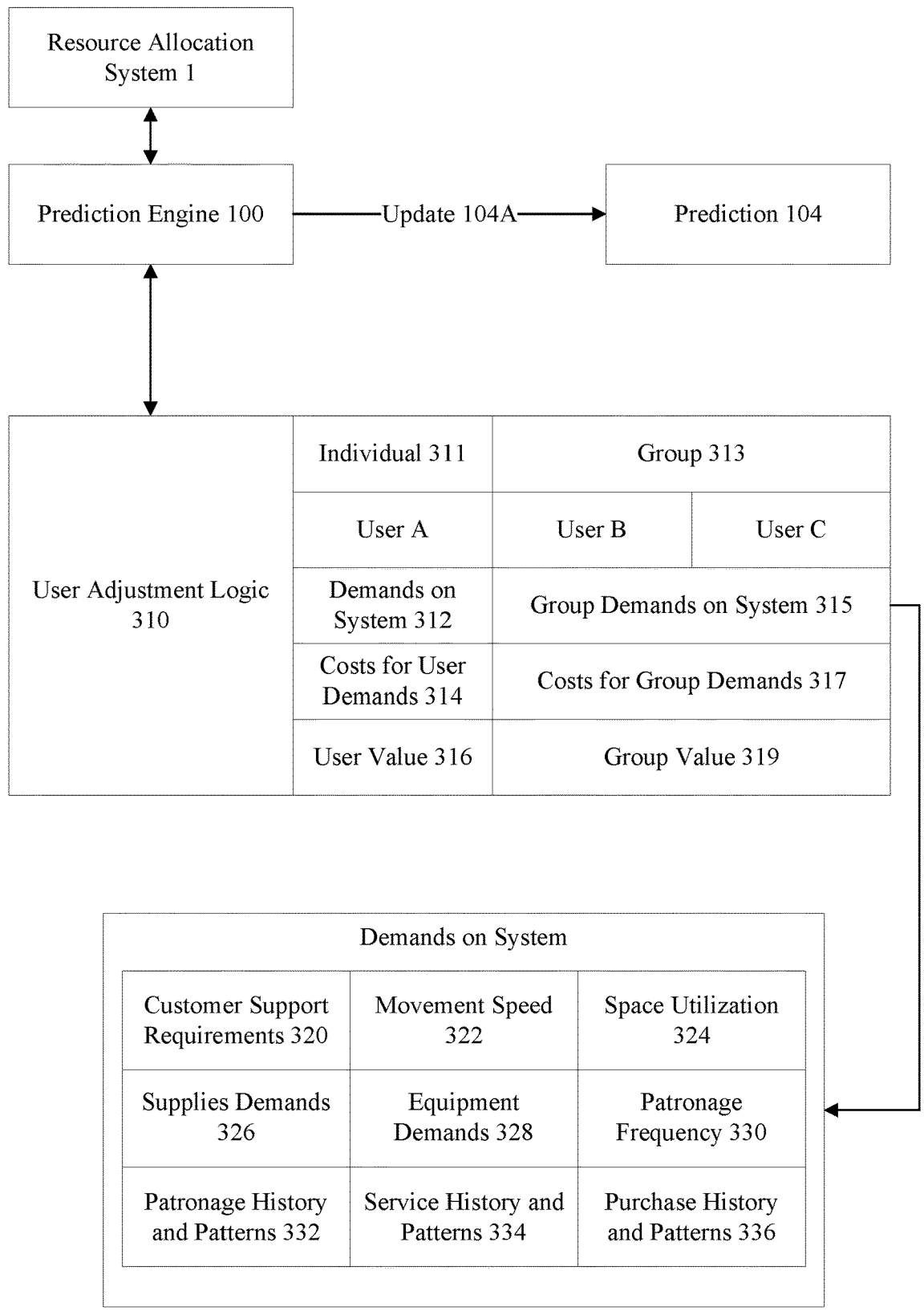
FIG. 15 illustrates a schematic diagram of the user adjustment logic.

FIG. 15, the resource allocation system 1 and/or prediction engine 100 may comprise or be connected to a user adjustment logic 310. The user adjustment logic 310 may be configured to store individual or groups of individual demands 312 on staff, space, and equipment resources. The user adjustment logic may also assign or determine a user value or customer value to the user. The user adjustment logic may comprise a database or be connected to a database configured to store user data such as the user system demands 312 (group demands 315), costs for user demands 314 (costs for group system demands 317), and/or user value 316 (group value 319). For example, some users might require more technical support 320 for entering a movie theater if they are not well-practiced using a smart phone. Some users might take more time 322 to walk down a ramp from an airplane. Some users might require more space 324 at a cocktail bar. Some users might require less supply resources 326 because they bring a mug to a coffee shop reducing costs associated with a disposable coffee cup. Some users might bring their own towel 328 to the gym reducing laundering costs. The user adjustment logic 310 may monitor and log user activity data such as patronage frequency 330, patronage history and patterns 332, service history and patterns 334, and purchase history and patterns 336.

The user adjustment logic may record timing of events such as how much time transpires for a particular user to accomplish a task, travel a certain distance 332, etc. The user adjustment logic may record what equipment 328 and space 324 the user requires to complete an intended service.

The user adjustment logic may share individual 311 or group based 313 user demands with the prediction engine so that the prediction engine can update its predictions. For example, the user adjustment logic may record that a group of customers patronize a restaurant on Saturdays and usually order three times the number of glasses of water that the average customer orders. In this hypothetical, these customers play football in the morning and then go for brunch at this restaurant. The extra glasses of water being ordered by these customers can slow down service at the restaurant, increasing wait time of current and future customers. In essence, a group of customers frequently places additional demands on a business, causing service at that business to slow down, generating a lag in service speed. The user adjustment logic can record an average demand (e.g., number of glasses of water consumed) and compare it against a specific user or groups of user demand. The user adjustment logic 310 may assign a value to a profile of the user (user value 316) or the group of users (group value 319) indicating a higher demand (water demand) for these users. The user adjustment logic 310 may share the user value or the user profile to the prediction engine 100 and/or resource allocation system 1.

Upon receiving this information from the user adjustment logic, the prediction engine 100 may update 104A its prediction 104 by (for example) increasing the wait time for the service (e.g., get a table at the restaurant) and send this adjustment to the resource allocation system 1.

For example, a resource allocation system with a computer containing a processor, memory and on-transitory computer readable code stored in the memory and configured to cause the processor to execute a series of instructions ma be provided. The resource allocation system may comprise a user adjustment logic and prediction engine. The user adjustment logic may be configured to: store individual demands on staff, space, and equipment resources; determine a user revenue for a user; determine user system demands based on the user; user system demands are requirements, tasks, or customizations that the user makes on the resource allocation system; determine user demand costs for the user system demands; user demands costs are costs in terms of money or labor needed to fulfill the user system demands; each user system demand having an associated user demand cost; and calculate a user value by subtracting user demands costs from user revenue. The prediction engine may be configured to: generate a first prediction comprising predicted service data about the user; receive user system demands from the user adjustment logic; and generate a second prediction based on the received user demands. This same system may be configured to record timing data associated with a service; and generate an equipment list needed to deliver the service; the list comprising at least three separate items. For example, for an airport security inspection, the airport may require a bin, x-ray machine, and driver's license reader to perform the inspection. The prediction engine may be configured to increase wait time based on user demands associated with the user; and the resource allocation system may be configured to send the user a message indicating a change in predicted wait time.

Load Balancing Engine

Figure 16:
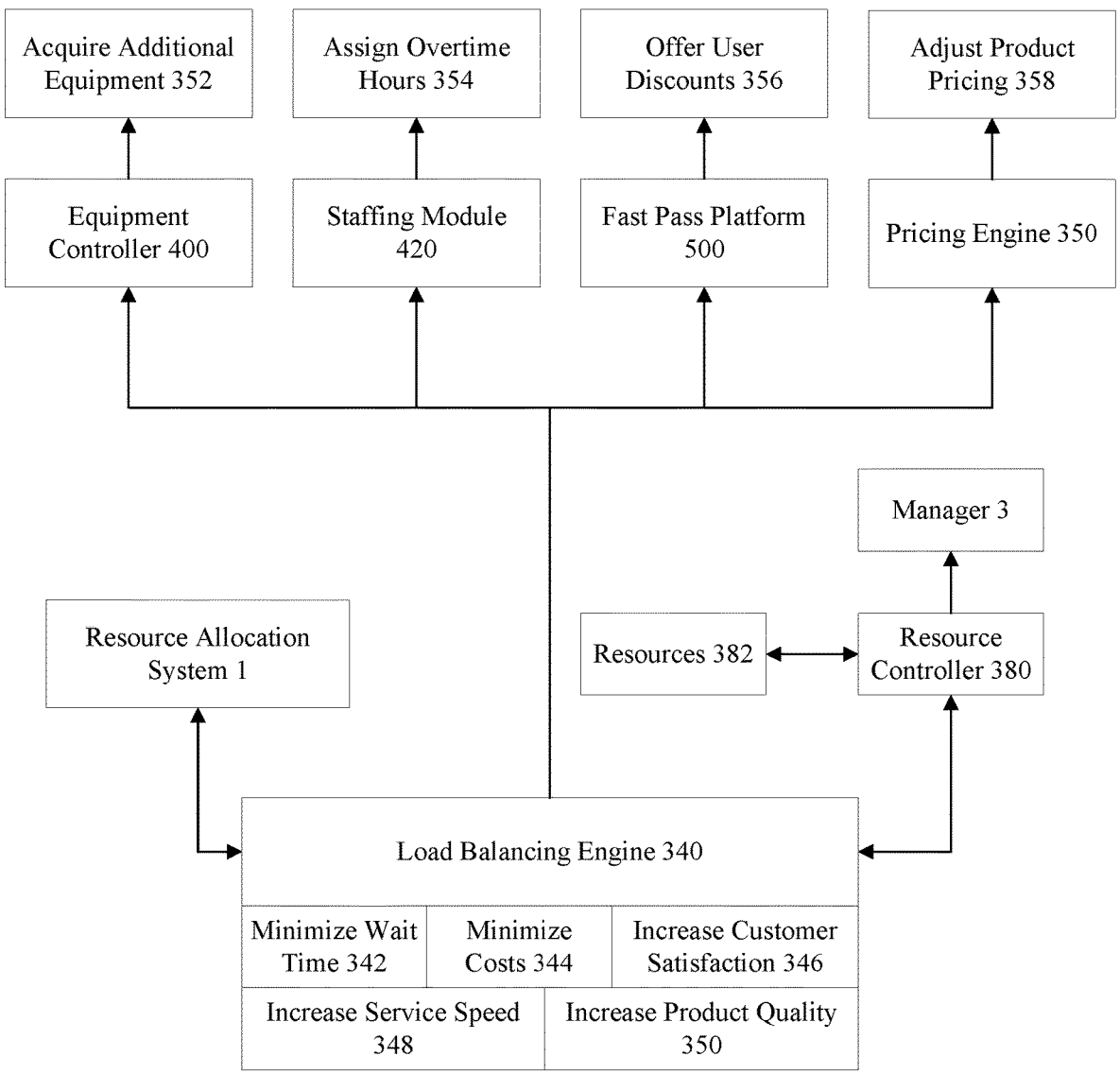
FIG. 16 illustrates a schematic diagram of the load balancing engine.

FIG. 16, the load balancing engine 340 may be configured to generate a load balancing problem. The load balancing engine may also be programmed to generate a solution to the load balancing problem. In some configurations, the service improvement module may generate the load balancing problem. The service improvement module may be configured to invoke the load balancing engine to generate a solution to the load balancing problems when predicted performance metrics are predicted to be below a threshold value (as measured by the service improvement module for example.) A load balancing problem may be a determination that predicted loads on the resource allocation system exceeds the resource allocation system's capacity to perform the service at or above a performance threshold. A solution to the load balancing problem is a change in the configuration of the resource allocation system (or one of its subsystems) that improves performance of the system so that the system can perform the service at or above the performance threshold. There are many ways the load balancing engine can improve performance of the resource allocation system. Improving performance (improving operations) can include improvement like: reducing or minimizing user wait time 342; reducing or minimizing costs to operate the system; reducing or minimizing costs to the system operator 344; increasing or maximizing customer satisfaction 346;

increasing or maximizing service speed 348; and/or increasing or maximizing product quality 350.

The above terms are relative to the state of the resource allocation system before the performance of the resource allocation system was improved. So, reducing user wait time means that the user wait time will be less than it was before the operation of the resource allocation system was improved. Improving service speed means that one or more services of the resource allocation system will be performed faster than it was before the resource allocation system was improved. Often there may be more than one solution to a load balancing problem. For example, the resource allocation system may generate the following solutions.

The load balancing engine 400 may instruct the equipment controller 400 to purchase new equipment 352 to meet the user demands (e.g., the equipment controller 400 may generate a purchase order, draft purchase order, send an email to a manager recommending equipment to be purchased, etc.). The load balancing engine 400 may instruct the staffing module 420 to assign overtime to a staff member 420 to assist the waitress 354 (e.g., the equipment controller 400 may generate a recommendation to assign overtime, prepare an overtime report, request staff to work overtime, etc.). The load balancing engine 400 may instruct the fast pass platform 500 to offer users of the system a discount or incentive to arrive later than originally scheduled or planned (e.g., come an hour later) 356. The load balancing engine 400 may instruct the pricing engine to adjust the price for a product or service (e.g., generate a recommendation to adjust the price for the product or service, prepare a pricing report, email the recommendation to a manager, etc.).

The load balancing engine 340 may assign relative values to each of these solutions and directly implement a solution. Or, the load balancing engine may generate a recommendation, report, email, message, etc. and send that communication to a manager, regional manager, or administrator. In this hypothetical, the load balancing engine 340 may direct the equipment controller to order more water pitchers so that the waitress can set the water pitchers on the table for the thirstier customers. More generally, the load balancing engine 340 may be configured to instruct the equipment controller 400 to purchase additional equipment to minimize wait time for customers. In some cases, the load balancing engine 400 may be configured to communicate with the staffing module 420 to indicate to the staff to perform a task or deploy equipment (a water pitcher in this case). Alternatively, the resource allocation system 1 and/or the load balancing engine 340 may be configured control the staffing module 420 directly.

Current Events Module

Figure 17:
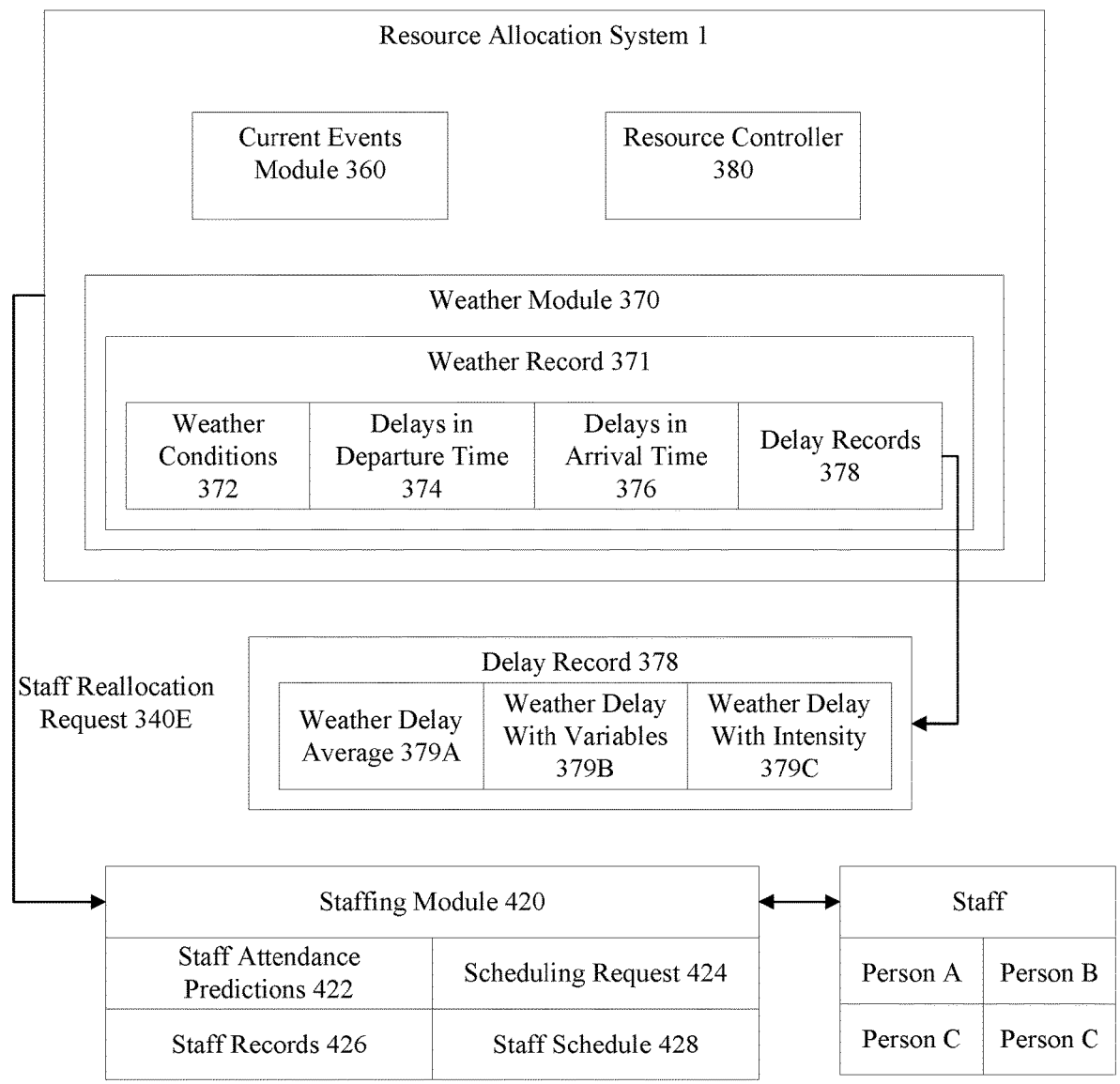
FIG. 17 illustrates a schematic diagram of the weather module and staffing module.

FIG. 17, the prediction engine 100 and/or resource allocation system 1 may comprise a current events module 360 configured to obtain news and/or event information that might influence actual service times. The current event module 360 may be configured to provide the news or event information to the prediction engine. The prediction engine may use the current events module to adjust a prediction. For example, the prediction engine may use data from the current events module to adjust its prediction for wait time or product supply. Based on the prediction, the load balancing engine may increase inventory, increase staff, change reservation times, etc. For example, a user or group of users may have situational demands that are different than the average situation. For example, a local city could host a famous dog show. Airplanes servicing that city will likely have many more dogs on the airplane leading up to the show. Hotels will have more demand for dog-friendly rooms. Pet stores in the local area will have increased demand for dog food.

As an example, the resource allocation system may comprise a current events module. The current events module may be configured to obtain news information about a current service or future service; generate a service impact; indicating an impact to performance of the resource allocation system; and send the service impact to a prediction engine. The current events module may track how similar previous new information affected performance of the system versus the associated predictions.

A resource allocation system may comprise a prediction engine configured to store prediction records containing prediction information including a news type and generate a first prediction about a service. The resource allocation system may comprise a history module configured to store service records containing service information including the news type. The resource allocation system may comprise a current events module. The current event module may be configured to obtain news information about a news event from a news source. The current event module may be configured to classify the news event by news type with a news classifier. The current event module may be configured to determine the news type to be a first news type. The current event module may be configured to access the prediction records from the prediction engine for predictions for services having the first news type. The current event module may be configured to access the service records from the history module for services having the first news type. The current event module may be configured to generate an event impact based on differences between the prediction records and the service records for the first news type. The service impact may indicate an impact to performance of the resource allocation system. The current event module may be configured to send the service impact to the prediction engine. The news classifier may be configured to classify the news event into one of many different news types or classifications. The news classifier may use standard artificial intelligence based classifications techniques to determine which classification best fits a particular news event. The prediction engine may be configured to adjust the first prediction by using the event impact. The resource allocation system may comprise a service improvement module configured to receive the service impact and adjust the first prediction. The service improvement module may be configured to determine the service impact will decrease system performance below a threshold value. The service improvement module may be configured to instruct a load balancing engine to generate a load balancing problem. The service improvement module may be configured to instruct the load balancing engine to generate at least one solution to the load balancing problem. The service improvement module may be configured to instruct the resource allocation system to implement the solution to the load balancing problem to bring system performance above the threshold level. The service improvement module may be configured to perform the service. The service improvement module may be configured to store performance information related to actual performance of the service. The prediction engine may be configured store the first updated prediction in the prediction records. The load balancing engine may be configured to receive the service impact; instruct a resource controller configured to increase a quantity of supplies based on the service impact; instruct a staffing module to increase a number of staff working a time associated with the service impact; and/or instruct a fast pass platform to send a message to a user; the message informing the user that a predicted wait time has increased. The load balancing engine may be configured to receive the service impact and instruct a resource controller configured to increase a quantity of supplies based on the service impact.

Transportation Vessel

A transportation vessel may refer to a community transportation vessel or a personal transportation vessel. A community transportation vessel may include devices configured to transport people or objects such as trucks, buses, cars, train, planes, ships, etc. Local weather conditions may cause or increase chances of causing delays in departure time or arrival time of a personal transportation vessel. A personal transportation vessel may include devices configured to transport one or small groups (less than 12) of people such as passenger cars, bikes, or motorcycles. People may use a personal transportation to travel to a community transportation vessel, and vice-versa. People may use a first community transportation vessel to travel to a second community transportation vessel.

Weather Module

FIG. 17 also illustrates that the resource allocation system 1 may comprise a weather module 370 configured to determine or receive weather conditions. The weather conditions may relate to weather conditions proximal to a certain location (such as an installation location of the resource allocation system or a location that resource allocation system is programmed to interact with). Proximal may be defined being with a radius of GPS location. For example, within 2 miles, 5 miles, or 25 miles of a location like an airport. The weather conditions may be local to an area of interest (like a military base or a business address). The weather module 370 may be configured to receive local weather conditions. Local weather conditions may cause or increase chances of causing delays in departure time or arrival time of a transportation vessel.

The weather module 370 may be configured to grade weather conditions on a scale such as 1-10, severe-mild, etc. The weather module 370 may be configured to determine an extent and/or probability of departure delays or arrival delays of community transportation vessels or personal transportation vessels.

The weather module 370 may be configured to generate a weather record 371 containing: a weather condition 372, delay in departure time generated by the condition 374, delay in arrive time 376 generated by the condition. The delays in departure time and arrival time might be a mean, median, sum, or other statistic associated with several experiencing variances in delay. The delay may be associated with departure or arrival of persons to the community travel vessel based on the person's travel method (e.g., rain makes people late for an airplane when they are driving, but not as much when those same people take the train). Or the delay may be associated with departure or arrival of the community travel vessel itself (e.g., a bus arrived late at a bus stop because it was snowing.)

The weather module may be configured to generate a delay record 378. The delay record may comprise a measurement of how much delay was generated by a specific weather condition. For example, the weather module may be configured to record plane average arrival time delay associated with light rain. In some configurations, the weather module will be configured to store a range of delays experienced when a specific weather condition occurs. In some configurations, the weather module will be configured to store a probability that a delay of a certain length will occur given a specific weather condition.

The weather module may be configured to record average weather delays 379A associated with basic weather conditions such as snow, rain, fog, etc. Or, the weather module may be configured to store weather delays with variables 379B such as rain rate, rain droplet size, maximum wind speed, average wind speed, and wind direction. Similarly, the weather module may be configured to store an intensity descriptor associated with the weather event such as light rain, moderate rain, or heavy rain (weather delay with intensity 379C). In the exemplary figure, the delay record comprises weather delay average 379A, weather delay with variables 379B, and weather delay with intensity 379C.

For example, a resource allocation system may be provided comprising a prediction engine configured to generate a first service prediction. The resource allocation system may comprise a weather module. The weather module may be configured to determine a first weather condition at an installation location of the resource allocation system. The weather module may be configured to assign a score to the weather condition. The weather module may be configured to generate a delay record containing a delay measurement caused by the weather condition. The weather module may be configured to determine a first weather condition type for the weather condition through a weather condition classifier. The weather module may be configured to determine a first weather condition severity for the weather condition through a weather condition intensity tool. The weather module may be configured to generate a weather record containing the weather condition, weather condition type, weather condition severity, and the score. The weather module may be configured to store the weather record in a database comprising a plurality a weather records; select a plurality of weather records that have the first weather condition score and the first weather condition type. The weather module may be configured to calculate an average weather delay for the first weather condition by performing an average function utilizing the selected weather records. The prediction engine may be configured to update its first service prediction based on the average weather delay to form an updated service prediction. The resource allocation system may comprise a service improvement module configured to determine that projected service levels based on the updated service prediction are below a service threshold; generate a load balancing problem based on the updated service prediction; and invoke a load balancing engine to solve the load balancing problem. The load balancing engine may be configured to generate a set of instructions for the resource allocation system to execute; and the instructions may be configured to improve performance of the resource allocation. The resource allocation system may be configured to execute the instructions; wherein execution of instructions improves performance of one or more subsystems of the resource allocation system. Improving performance of resource allocation system may include improvements such as: reducing user wait time; reducing to operate the resource allocation system; and increasing service speed.

Staffing Module

FIG. 17, the staffing module 420 may be configured to determine staffing needs for a location at a particular time, deploy staff to a specific location, direct staff to perform a particular operation, or remove staff from a location or operation. The staffing module may be configured to adjust work schedules so that a minimal, functional, or optimal number of staff is present to improve service benchmarks.

The staffing module 420 may be configured to maintain staff records for one or more staff persons. For example, the staffing module may be configured to maintain records of when a particular staff person or group of staff people call out "sick" such as birthdays, holidays, and days near holidays. Additionally, the staffing module 420 may be configured to receive weather information from the weather module 370. The staffing module may record staff person attendance based on types of weather conditions. The staffing module may generate predictions 422 as to whether a staff person or group of staff people will not work (call out sick) based on a type of weather condition.

The staffing module 420 may be configured to send a scheduling request 424 to staff to invite, request, or require staff to work overtime. The staffing module 420 may be configured to automatically schedule staff for mandatory overtime or it may be configured to adjust staff shift times to have more people available. The staffing module 420 may be configured to schedule staff break times at expected lulls in user volume at a particular time and location.

In some configurations, the resource controller 380 may determine that a current or planned staffing team is inadequate to handle an anticipated volume of users expected at a certain time in a certain location. The resource allocation system 1, upon receiving this determination from the resource controller, may be configured to interact with the staffing module 420. The system may be configured send a staff reallocation request 340E to the staffing module 420. Upon receiving the staff reallocation request, the staffing module 420 may increase number of staff at the location at the specific time, and/or switch which staff is scheduled to be at the location at the specific time.

The staffing module may comprise logic to generate staff attendance predictions 422, generate scheduling requests 424, maintain or generate staff records 426, and maintain or generate a staff schedule 428. The staffing module may communicate with staff person A, staff person B, staff person C and staff person D through electronic means such as messaging, notifications or email. The staffing module may be configured to assign a higher performing staff person to a location to replace a lower performing staff person during a time of higher work output demand. A higher performing staff person may be defined a staff person that: produces more work product per hour than a lower performing staff person, produces few member complaints than a lower performing staff person, has higher user reviews than a lower performing staff person, has higher managerial reviews than a lower performing staff person, requires less manager supervision than a lower performing staff person, or a combination thereof. The staffing module may determine or assign a staff value to a staff person based on one or more of the above factors. A higher performing staff person may have a higher staff value as compared to a lower performing staff person. The staffing module may be configured to predict lulls in demand for a service and schedule staff break time during those lulls.

As an example, a resource allocation system may comprise a staffing module configured to: perform staffing tasks and maintain staff records of work history for one or more staff persons. The system may comprise a weather module configured to determine a first weather condition on a first date that a first staff person failed to report for assigned work task. The staffing module may be configured to: determine a first correlation between missed work day for the first staff person based on the staff records and the first weather condition. The system may comprise a prediction engine configured to: generate a first prediction containing a service time interval; receive the first correlation from the staffing module; and update the first prediction based on the first correlation. The system may comprise a service improvement module configured to: determine that projected service levels based on the updated prediction are below a service threshold; generate a load balancing problem based on the updated service prediction; and invoke a load balancing engine to solve the load balancing problem. The load balancing engine may be configured to generate a set of instructions for the resource allocation system to execute; the instructions configured to improve performance of the resource allocation. The resource allocation system may be configured to execute the instructions; wherein execution of instructions improves performance of one or more subsystems of the resource allocation system. The staffing module may be configured to determine a second weather condition on a second date that a second staff person arrived late to an assigned work location; and determine a second correlation between missed work day for the second staff person based on the staff records and the second weather condition. The prediction engine may be configured to receive the second correlation from the staffing module; and generate a second prediction based on the first prediction, first correlation and the second correlation. The service improvement module may be configured to determine that projected service levels based on the second service prediction are below a service threshold; generate a second load balancing problem based on the second prediction; and invoke the load balancing engine to solve the second load balancing problem. The load balancing engine may be configured to generate a second set of instructions for the resource allocation system to execute; the second set of instructions may be configured to improve performance of the resource allocation; and the resource allocation system may be configured to execute the second set of instructions; wherein execution of second set of instructions improves performance of one or more subsystems of the resource allocation system. The staffing tasks may include: determining staffing needs for a location at a particular time; deploying staff to a specific location; directing staff to perform a particular operation; and removing staff from a location or operation. The staffing module may be configured to send a scheduling request to staff persons; the scheduling request inviting, requesting, or requiring the staff persons to work at a previously unscheduled time.

In another exemplary configuration, the resource allocation system may comprise a staffing module configured to maintain staff records of work history for one or more staff persons. The resource allocation system may comprise a current events module configured to: obtain news information about a news event from a news source; generate an event impact based on the news information; wherein the service impact indicating an impact to performance of the resource allocation system; and send the service impact to the prediction engine. The system may comprise a prediction engine configured to: generate a first prediction containing a service time interval; receive the service impact from the current events module; and update the first prediction based on the first news information. The system may comprise a service improvement module configured to: determine that projected service levels based on the updated prediction are below a service threshold; generate a load balancing problem based on the updated service prediction; and invoke a load balancing engine to solve the load balancing problem. The load balancing engine may be configured to generate a set of instructions for the resource allocation system to execute; the instructions configured to improve performance of the resource allocation; and the resource allocation system may be configured to execute the instructions; wherein execution of instructions includes a staffing instruction to the staffing module. The staffing module may be configured to:

execute the staffing instruction; wherein execution of the staffing instruction causes the staffing module to message additional staff persons to report for work at a previously unscheduled time.

The staffing module may be configured to maintain staff records of work history for one or more staff persons. The staffing module may be configured to determine a staff work output at a first time; determine staffing needs at the first time. The staffing module may be configured to determine staffing needs exceeds staff work output. The staffing module may be configured to adjust a first person staff schedule to increase staff workout at the first time. The resource allocation system may comprise a prediction engine configured to generate a first prediction. The system may comprise a service improvement module configured to determine that projected service levels based on the first prediction is within a service threshold.

In another configuration, the staffing module may be configured to maintain staff records of work history for one or more staff persons. The staffing module may be configured to determine a first staff work output at a first time for a first work project. The staffing module may be configured to determine a second staff work output at a second time for a second work project; determine staff workout output at the first time for the first work project exceeds staffing needs at the first time in the first work project. The staffing module may be configured to determine staff workout output at the second time in the second project is below a threshold requirement for staffing needs at the second time in the second project. The staffing module may be configured to select a first staff person assigned to work at the first work project. The staffing module may be configured to send the first staff person a message to begin work on the second work project. The first work project may be at a first work location; and the second work project may be at a second work location. The staffing module may be configured to adjust send a scheduling request to staff persons. The staffing module may be configured to the scheduling request inviting, requesting, or requiring the staff persons to work at a previously unscheduled time.

Resource Controller

Figure 18:
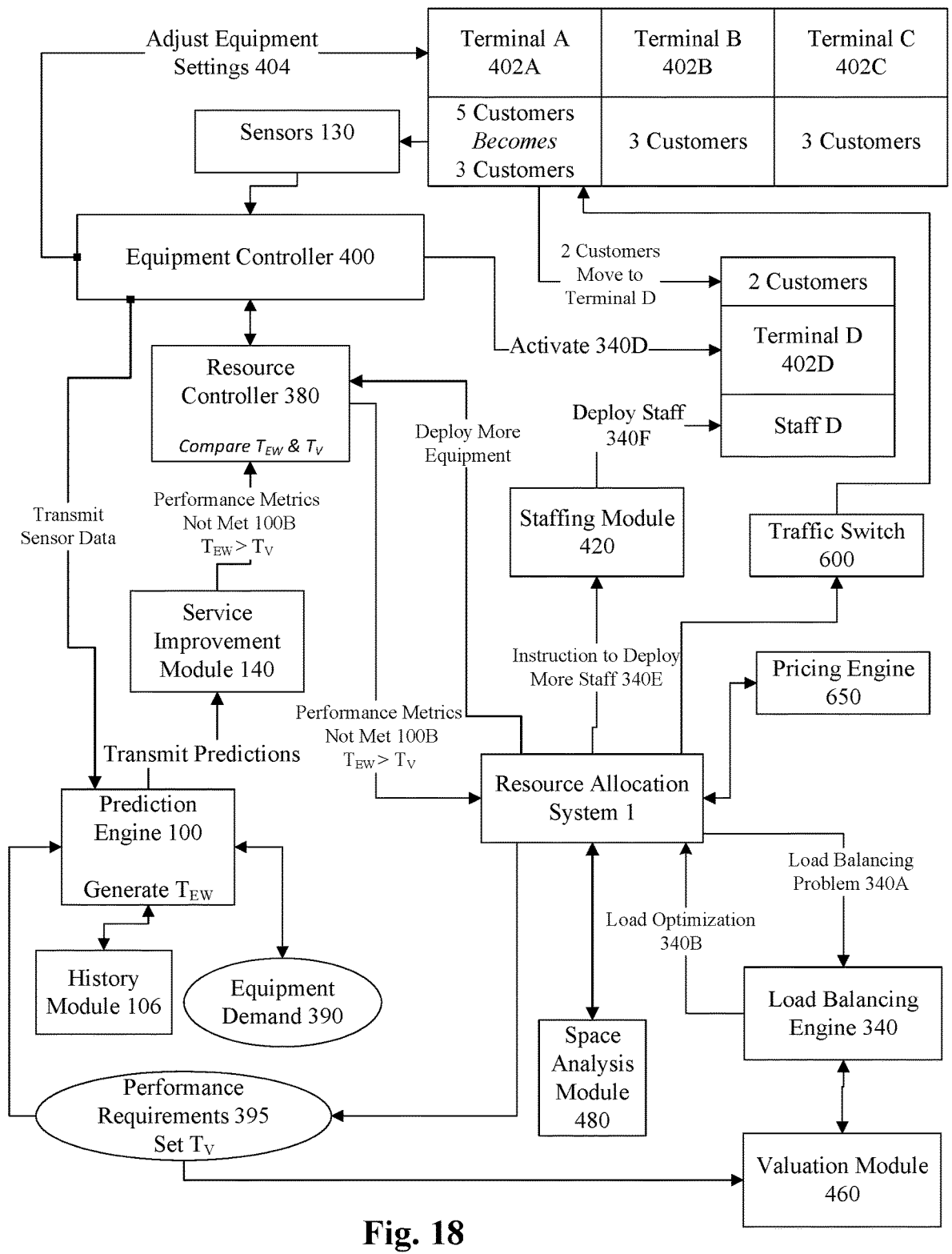
FIG. 18 illustrates a process flow of the resource allocation system which involves adjusting resources to meet service requirements.

FIG. 18, the resource allocation system 1 may comprise a resource controller 380. The resource controller may be configured to determine whether there are enough resources to minimize wait times at specific locations at specific times. For example, the resource controller 380 may be configured to send a notification to a manager 3 that there are not enough staff people given anticipated wait times at restroom in a stadium. In such an example, loading balancing engine 340 and/or the resource controller may communicate with a traffic switch 600 to illuminate a sign directing customers or users to an alternate bathroom.

The resource controller 380 may be configured to order, rent, schedule, purchase, sell, loan, ship, or receive products, equipment, and supplies from the resource allocation system. For example, the resource controller may order supplies to be sent to a security station from a warehouse. The resource controller 380 may be configured to order, rent, schedule, purchase, sell, loan, ship, or receive products, equipment, and supplies from an outside location (such as a third party vendor.) For example, the resource controller may order extra chairs from a furniture store. The resource controller 380 may be configured to generate a report, recommendation message, notifications, etc. to a staff person, manager, etc. A report might indicate current inventory levels of products, conditions of equipment, or an estimated depletion date of supplies. A recommendation message may include a recommendation to improve performance of the system or prevent a reduction of performance in the future. For example, the message could recommend to a manager that 100 supplies should be order within a set number of days to prevent a predicted shortage. The resource controller may be integrated/connected with the prediction engine and history module to form a recommendation message.

In an exemplary configuration, a resource allocation system may comprise a resource controller configured to: determine a first number of available resources; determine a second number of required resources; and determine the second number is greater than the first number. In essence, there is more demand on the resource allocation system that resources to fulfill the demand. The resource allocation system may comprise a prediction engine configured to: generate a first prediction, and update the first prediction when the second number is greater than the first number. In effect, update the first prediction in cases where demand is greater than resource supply. The resource allocation system may comprise a service improvement module configured to: determine the first prediction does not meet a service performance threshold; generate a load balancing problem; and invoke a load balancing engine. In other words, the system may comprise logic that determines the first service prediction contains an estimate that the system will perform under a service benchmark. Having determined that available resources are too low to meet a supply, resulting in a prediction under the threshold, the resource allocation system may invoke the load balancing engine configured to solve the load balancing problem. The load balancing engine may instruct the resource controller to increase the first number of available resources to a value greater than the second number. Having received the instruction, the resource controller may be configured to determine a third number of resources wherein the first number+the third number is greater than the second number; and acquire the third number of resources. In this case, the resource controller is configured to acquire more resources so that resource supply is above the resource demand. The resource controller may allocate materials resources from a storage facility to be deployed, deploy equipment by activating the equipment, schedule more staff resources via the staffing module to be work at a station, order new supplies to replace consumed supplies, etc.

Equipment Controller

The resource controller 380 may comprise or be linked to an equipment controller 400, staffing module 420, and/or space analysis module 480. The equipment controller may comprise the same programming as the resource controller 380. The equipment controller 400 may comprise programming to control (change settings, activate, deactivate, etc.) various types of equipment. In the referenced figure, the equipment controller is configured to control terminal A, terminal B, terminal C, and terminal D. In the process flow, the equipment controller activates terminal D in response to a determination by the resource control 380 that the estimated wait time is too long.

FIG. 18, a terminal 402 (terminal A 402A, terminal B 402B, terminal C 402C) is an electronic device (such as a computer) that provides performs functions and processes such as accounting, sales, tracking, inventory, scanning, searching, data display, data storage, etc. associated with a task for a user, customer or passenger. For example, a search terminal may scan luggage or users for contraband. A cash register terminal may receive user or customer payment and adjust product inventory.

The resource allocation system 1 might establish performance requirements 395 or performance metrics such as maximum queue time or maximum average queue times for users at a terminal. For example, the resource allocation system 1 may establish that no check-out lines should have users (people) waiting in line for more than X minutes. The equipment controller 400 (resource allocation system or prediction engine) might calculate that the average customer takes $T_c$ minutes to checkout ($T_c$ is a measurement of time). The prediction engine 100 (or resource allocation system) may be configured to use a sensor(s) 130 such as a network of cameras to determine there are $N_1$ customers 403A in line for terminal A, $N_2$ customers 403B in line for terminal B, and $N_3$ customers 403C in line for terminal C (N is a natural number). The prediction engine 100 may comprise image and/or video graphic analysis software 403 to determine how many people are in line based on captured images. Other techniques may be used to quantify how many customers are waiting in line. The prediction engine 100 may determine a predicted (estimated) wait time ($T_{EW}$) greater than a threshold value $T_v$.

The predicted wait time (estimated wait time) $T_{EW}$ may be an estimate (prediction) of an amount of time or a start time for an event to occur generated by the prediction engine. The resource allocation system may have a performance requirement 395 (e.g., a threshold value $T_v$) for long a wait time should be (or a start time, end time, etc.) The resource controller 380 may indicate that certain performance requirement 395 metrics (such as resources, equipment, etc.) are not sufficient to meet performance metrics 100B when $T_{EW} > T_v$, because predicted wait time ($T_{EW}$) is greater than the performance requirement ($T_v$). The equipment controller 400 may communicate this determination to the resource allocation system. In the event that wait time ($T_{EW}$)≤the performance requirement ($T_v$), the resource controller 380 may communicate a message to the resource allocation system 1 that an operation (such as customer wait time) is within performance requirements.

The equipment controller 400 may be configured to monitor, determine, and/or evaluate an equipment demand 390 amount for a location comprising one or more terminals (402A, 402B, 402C). The equipment controller 400 may be configured to, continuously, periodically, or based on a command from the resource allocation system, determine whether all, most, certain, at least one, or a randomly selected performance requirement is currently being met by the resource allocation system. In the example shown in FIG. 18, the equipment controller 400 may be configured to monitor customer wait time. The equipment controller 400 may be configured to perform certain actions when the resource controller 380 determines predicted customer wait time is above a threshold value ($T_v$). The prediction engine 100 may be configured to determine equipment demand 390 based on a location's processing needs including current, future, or past needs and/or capabilities. In this example, the equipment controller 400 may use sensors 130 to determine a number of customers at each terminal. Optionally using information from the history module 106 (and stored service records), the prediction engine 100 may determine the current equipment demand 390 based on the number of customers at the terminals. Based on the equipment demand 390, the prediction engine 100 may calculate a predicted wait time ($T_{EW}$) greater than $T_v$. The equipment controller 400 may communicate 100 that the performance metrics are not being met to the resource allocation system, or the resource allocation system may be able to directly access information stored in the equipment controller.

At this point (e.g., receipt or determination that customer wait time exceeds the performance requirement), the resource allocation system can initiate the load balancing engine 340 to solve the load balancing problem 340A. The load balancing engine (in this example) generates an update to decrease the customer wait time (e.g., a solution to improve current operations performance). In some cases, the update may be an optimized solution. The load balancing engine may communicate the update 340B to the resource allocation system.

In this example, the update from the load balancing engine 340 programs (causes, instructs, requires, etc.) the resource allocation system to take certain steps. For example, the resource allocation system may program (cause, instruct, require) the equipment controller 400 to activate 340D another terminal (402D), instruct 340E the staffing module 420 to deploy 340F an additional staff person (Staff D), adjust equipment settings 404 to cause the terminals to run faster, and cause the traffic switch to display a notice to the customers that a new terminal 402D is open. In this example, 2 customers switch from Terminal A to Terminal D, thereby lowering the average customer wait time below the performance requirement 395 (performance threshold).

In this example, the load balancing engine generated a solution to the load balancing problem which involved activating an additional terminal, deploying a staff person, and sending a communication to the customers of the new terminal via the traffic switch. In the example of a register, the equipment controller could program the registers with modified equipment settings 404 that allow them to run faster or process fewer operations during checkout (turbo mode, don't require a shopper card, don't request a customer donation, request only one form of identification, increase scan speed, don't scan for certain types of items, etc.) More generally, the equipment controller 400 (or resource allocation system 1) may be configured to adjust equipment settings 404 to make them run faster or slower depending on projected wait times. For example, security scanners often comprise multiple levels of scanning precision. Increasing scanning precision (decreasing false positives and decreasing false negatives) may increase scanning time. However, increasing scanning precision may decrease user search (pat down) time. The equipment controller 400 may be configured to optimize scan precision so that total time wait time is minimized. The equipment controller may contain logic to determine whether a decrease in precision (increase of false negatives in this case) is an acceptable risk given a decrease in wait time. The equipment controller 400 may be configured to interface with the staffing module 420 to determine whether additional staff can be obtained at a specific time. The staffing module 420 may also be configured to obtain or dismiss staff based on operational needs.

As discussed, equipment (such as terminals) may contain settings that adjust speed of the terminal (such as boosting memory speed, CPU speed, scanning depth, resolution settings, etc.). Increasing the speed of equipment (turbo mode, performance mode, security mode, precision mode) may come at a cost of increased energy demands, increased heat, increased noise, decreased equipment life, increased processing time, etc. The equipment controller 400 and/or load balancing engine 340 may contain logic configured to determine whether improvements in speed are cost effective for a time frame.

The history module 106 (alone or combination with the staffing module 420) may be configured to maintain records of days and times where the amount of staff resources or equipment resources is too high or too low for the volume of customers. The prediction engine (equipment controller or resource allocation system) might be configured to analyze patterns of terminal needs versus supply (staff, space, and equipment resources) on an hourly, weekly, monthly, or yearly bases. The prediction engine may be configured to use these analyzed patterns to make predictions for anticipated resources (staff, space, and/or equipment) at a future time. The prediction engine controller may be configured to adjust its anticipated resource predictions to account for changes in patterns of behavior based on holidays and over events such as a sporting game. For example, the resource allocation system may comprise a history module comprising service records containing past customer wait time and a prediction module configured to generate a predicted customer wait time based on past customer wait time before a first time. The resource allocation system may comprise an equipment controller configured to: receive an instruction from the load balancing engine to activate a first terminal before the first time; and switch the first terminal from an inactive state to an active state before the first time.

Pricing Engine

FIG. 18, the resource allocation system may comprise a pricing engine 650. The pricing engine may be configured to adjust pricing of a particular service (bus ticket, movie ticket, meal, etc.) based on feedback from the resource controller. The pricing engine may be configured to lower a price on a service or product if the resource controller predicts an estimated wait time below a threshold value. Conversely, the pricing engine may be configured to increase a price on a service or product if the resource controller predicts an estimated wait time more than a threshold value.

For example, a resource allocation system deployable at a location; the resource allocation system comprising a computer containing a processor, memory and on-transitory computer readable code stored in the memory and configured to cause the processor to execute a series of instructions. The resource allocation system may comprise a prediction engine configured to generate a prediction record in a database; the prediction record comprising a prediction and associated user information. The resource allocation system may comprise a history module configured to store a service record for a service. The resource allocation system may comprise a service improvement module configured to: set a service performance threshold; determine that the prediction does not meet the service performance threshold; generate a load balancing problem; and instruct a load balancing engine to solve the load balancing problem. The load balancing engine configured to instruct a pricing engine to change pricing for the service. The prediction engine may be further configured to update the prediction based on the increase in pricing. The service improvement module may be configured to: determine the updated prediction does not fall within the service benchmark; and instruct the pricing engine to change pricing for the service a second time.

Valuation Module

FIG. 18, a valuation module 460 may be configured to calculate costs for failure to meet a performance requirement 395. The valuation module may calculate costs associated with operations such as long wait times, lack of certain equipment, late arrivals of community travel vessels. The valuation module may be configured to provide a calculation of lost profits, direct costs, consequential damages, and other costs analysis techniques. The equipment controller 400 may be configured to request a report from the valuation module 460 before ordering new equipment. In some configurations, the load balancing engine 340 may be configured to program the equipment controller 400 to order new equipment based on results generated by the valuation module 460. The equipment controller 400 may be configured to order new equipment when the calculation of the valuation module is above a threshold value. The equipment controller 400 may be programmed to order new equipment when valuation module determines a calculated cost of the new equipment is less than a calculated cost for failure to meet performance requirements. The equipment controller may also be programmed to order new equipment when the load balancing engine determines a more cost effective solution is not available and the calculated cost of the new equipment is less than a calculated cost for failure to meet performance requirements.

For example, a resource allocation system deployable at a location may comprise a computer containing a processor, memory and on-transitory computer readable code stored in the memory and configured to cause the processor to execute a series of instructions. The resource allocation system may comprise a prediction engine configured to generate a prediction record in a database; the prediction record may comprise a prediction and associated user information. The resource allocation system may comprise a history module configured to store a service record for a service. The resource allocation system may comprise a service improvement module configured to: set a service performance threshold; determine that the prediction does not meet the service performance threshold; and generate a load balancing problem. The resource allocation system may comprise a valuation module configured to determine a cost for the prediction not meeting the service performance threshold. A load balancing engine may be configured to determine a solution to the load balancing problem that costs less than the cost for the prediction not meeting the service performance threshold. The resource allocation system may be configured to implement the solution to the load balancing problem.

Space Analysis Module

FIG. 18, the resource allocation system 1 may program the space analysis module 480 to change store layouts, adjust access pathways, and adjust settings on a wayfinding device (such as a digital sign, digital map, or digital directory, etc.) For example, if the system is deployed in a shopping mall, the space analysis module could determine that there are too many people in the food court at a particular time. The space analysis module could interact with the traffic switch discussed below (directly or through the system) to change images on a display that informs people about food in the food court, and vice versa.

User Account and User Account Database

In some configurations of the invention, the system has one or more user accounts associated with a specific user. The user account may contain user contact details, financial information, purchase history, downloads, wishlists, saved items, and more. The system may store the user accounts in a user account database.

Fast Pass Platform

Figure 19:
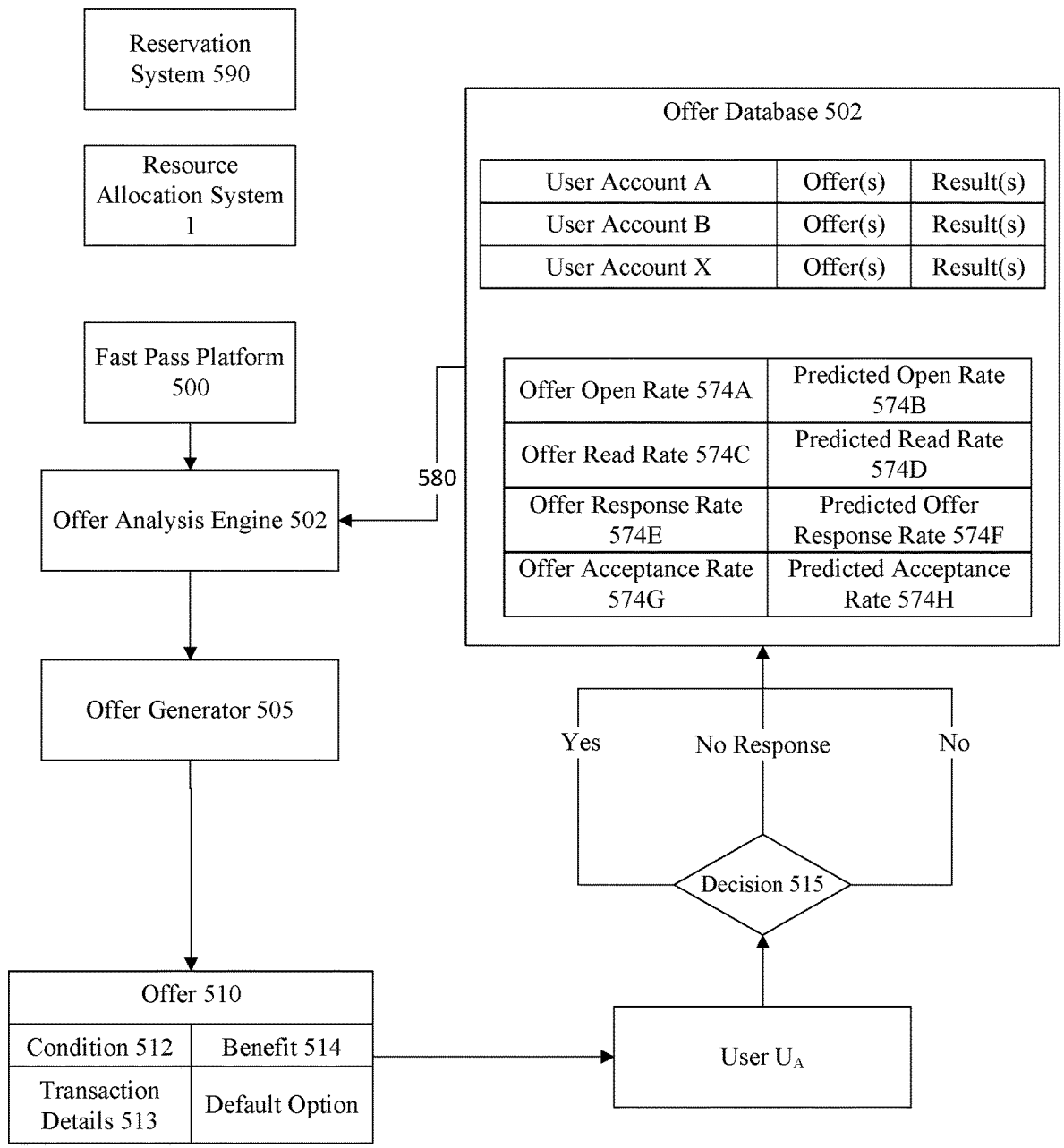
FIG. 19 illustrates a process flow of the offer analysis engine.

FIG. 19, the system may comprise a fast pass platform 500. The fast pass platform 500 may comprise an offer generator 505 configured to send a message to a user $U_x$ containing an offer 510. An offer may comprise a condition, a benefit, and transaction details. A condition can be something the user needs to accept or do in exchange for the benefit. The benefit is something of value that the user receives as reward for satisfying the new condition. Transaction details may include information like time and date of offer, how the offer was distributed (email, text, push notification), service details (reservation at 5 PM vs 6 PM or 1 hr reservation vs 2 hr reservation), why the service was scheduled (personal flight vs. business flight), etc. In some cases, the offer 510 may comprise one or more conditions and one or more benefits. The offer may comprise a default decision if no response is made by the user.

The fast pass platform 500 may comprise an offer database 502 comprising accounts and records of user decisions, offers, and results. The database may store various types of information about the offer including the condition, benefit, and transaction details. The database may store details about the result such as whether the offer was accepted, how long acceptance or refusal took, how the offer was transmitted, time of day for the offer, etc. As shown, the fast pass platform may be configured to store the results of the user decision 515 regardless as to whether the decision is accepted, declined, or no response. The offer analysis engine 502 can analyze patterns and behaviors of specific users and general users to improve offer quality. Offer quality may comprise a number of factors such as acceptance rates of offers, decrease costs for benefits, improve speed of acceptance of offers, improve response rates to offers using data collected and stored by the offer database. The offer analysis engine 502 can employ techniques such as machine learning and neural networks to improve offer quality.

FIG. 19, the fast pass platform 500 may calculate an offer open rate 574A, predicted offer open rate 574B, offer read rate 574C, predicted read rate 574D, offer response rate 574E, predicted offer response rate 574F, offer acceptance rate 574G, and predicted offer acceptance rate 574H. These rates may be determined for a plurality of users (e.g., an average, mean, median for users $U_A$-$U_x$) or they may be specific to single user (e.g., the acceptance rate for $U_A$ or $U_D$). The fast pass platform may organize these rates based on the user, conditions, benefits, and/or transaction details of the offer. For example, the offer open rate may be a percentage of all users that open the offer. The offer read rate may be a percentage of certain users that read all or a portion of the offer. The offer response rate may be a percentage of certain users that click on a link or button or take some action in response to the offer. The predicted offer acceptance rate may be a calculated rate of acceptance of the offer based on the fast pass platform history of sending offers to this user and/or other users. The fast pass platform may record data associated with how many people open the message to generate an average open percentage (open rate 574A) and how many people on average respond to the message to generate an average reaction percentage (e.g., a response rate 574C). The fast pass platform 500 may be configured to determine an acceptance rate 574G of the user or an average acceptance of a plurality of users $A_r$. The fast pass platform 500 may comprise a feedback loop (580) used to adjust the offer 510 based on the open rate 574A and the response rate 574E. In a similar manner, the fast pass platform may be configured to determine a predicted acceptance rate of an offer containing a discount, credit, or bonus item. The fast pass platform may be configured to modify the discount, credit, or bonus item so that enough users accept the offer so that the predicted wait time (or average predicted weight time) of a plurality of users is below a threshold value $T_v$.

The resource allocation system may comprise a reservation system 590 configured to accept a reservation from one or more users. A reservation may include a time, date, duration, location, service type, service description, user information (name, phone, email, address, user ID, etc.)

The fast pass platform may be configured to adjust a passenger arrival curve by offering users a fast pass option to show up at a different time. For example, the fast pass option may include showing up an hour early, showing up later than originally scheduled, guaranteeing no in-line time for showing at a time other than the reserved time, providing an inflight discount, providing a free bag check, including bonus food or beverage products, etc.

Figure 20:
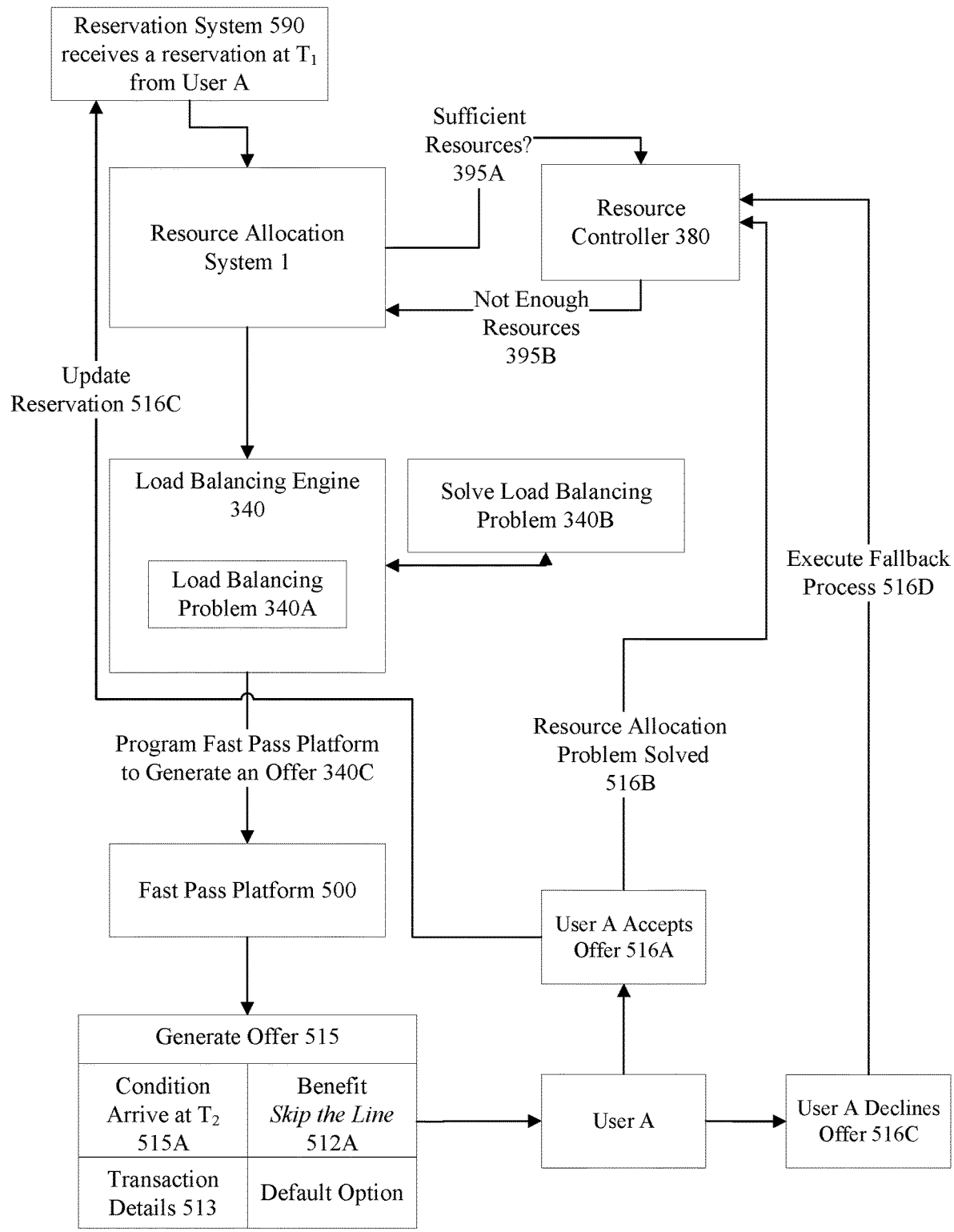
FIG. 20 illustrates a first process flow of the load balancing engine determining a solution to a load balancing problem.

FIG. 20, the process flow may involve user $U_A$ making a reservation at a first time $T_1$ (time and date). The resource allocation system 1 may query the resource controller to determine whether the system has sufficient resources 395A to meet performance requirements 395. As shown, the resource controller 380 determines there are not enough resources to meet the reservation 395B (the load balancing engine and/or the service improvement module may also generate this determination in some configuration). The resource allocation system 1 may determine that more users are scheduled to interact with the environment than the resources of the system can handle while maintaining service speeds (wait times, etc.) within threshold value $T_v$.

When the system encounters more demand that it can currently fulfill within the performance requirements, the system may generate a load balancing problem 340A to solve. The load balancing engine may be configured to solve the solution to the loading balancing problem 340B. The load balancing engine 340 may determine that the resource allocation system 1 can maintain services operating within threshold values if user $U_A$ arrives at a second time $T_2$. The load balancing engine may program 340C the fast pass platform 500 to send a calculated offer 515 inviting user $U_A$ to arrive at $T_2$ 515A in exchange for a first benefit (e.g., the user can access the front of a screening line 512A if he or she arrives 20 minutes before his or her scheduled time.) If user A accepts 516A the offer, the resource allocation problem is solved 516B. If user A doesn't accept 516C, fast pass platform 500 may inform (send a communication to) the resource controller 380 (resource allocation system and/or load balancing engine 340) indicating the generated offer was declined. At this point, the resource allocation system 1 would generate a fallback process to attempt to keep operations standards within the threshold. The next figure demonstrates three fallback processes spread across four different users.

Figure 21:
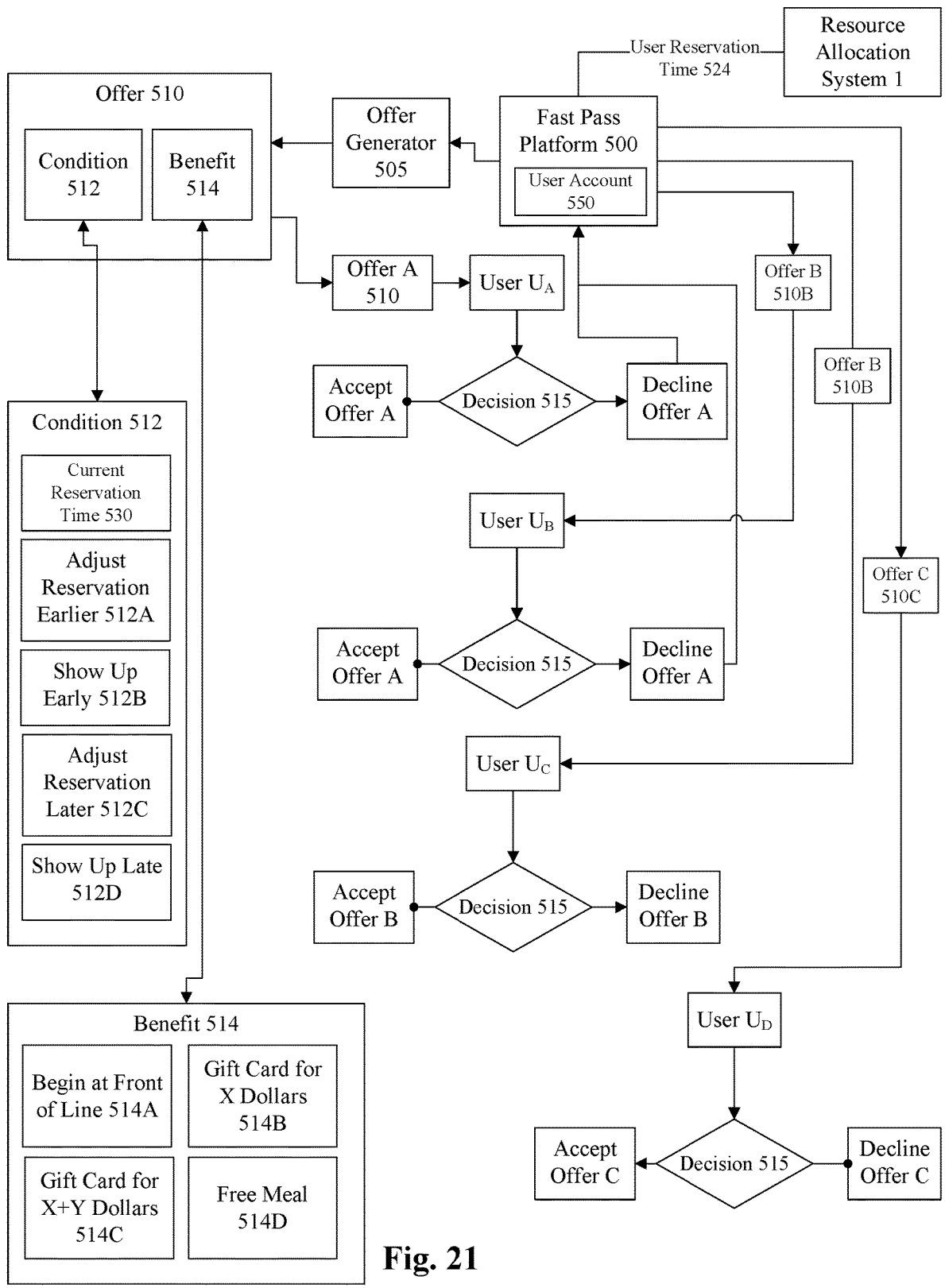
FIG. 21 illustrates a process flow of the fast pass platform.

FIG. 21, the offer 510 may comprise a condition 512 and a benefit 514/reward for satisfying the condition. For example, the condition could request user approval to adjust a reservation time 524 earlier 512A or later 512C than a current reservation time 530. The offer 510 may be a request to show up early 512B/earlier or show up late 512D/later. Early, earlier, late, later may be expressed as a discrete arrival time (show up or check-in by 10 AM), or as a relative arrival time (show up or check-in an hour before your reservation).

FIG. 21, the benefit 514 could be access 514A to the front of a line the user would need to wait in absent the offer. Offers can also be a gift card for X dollars or X+Y dollars for example. The offer may comprise a condition 512 to arrive at a specific time (e.g., show up earlier than a previously arranged time) in exchange for a benefit 514 such as a discount on a future service. The offer 510 may be a request to show up early in exchange for a credit for service or product already purchased by the user. The offer 510 may be a request to show up early in exchange for a bonus service or product (free bag check, free desert, free baseball cap, etc.)

FIG. 21, shows an offer (offer A) being sent to $U_A$. $U_A$ can decline or accept the offer. If $U_A$ accepts, then the change in arrival time may restore services to be within performance standard threshold values. If $U_A$ declines or does not respond within a preset time interval, the fast pass platform 500 may be programmed to generate a different offer (offer B) to send to $U_A$. Or the fast pass platform can send the same offer (offer A) or a different offer (offer B) to $U_B$. The offer generator 505 can be configured to change the condition and/or the benefit in the offer. In the example, the offer generator 505 sends a second offer 510B with the same condition, but a different benefit 514B. $U_B$ also declines. The offer generator 505 may be configured to send the same offer 510B to $U_C$. In this example, $U_C$ also declines. In illustrated example, benefits 514B and 514C are related (they are both gift cards), but benefit 514C is for a gift card in larger amount (denoted by X+Y, wherein X and Y are positive numbers.) In this example, adding Y to the offer is enough to convince Up to accept—restoring performance metrics within threshold values. Of course, $U_C$ might have accepted offer 510C as well, or $U_D$ might have accepted offer 510B. In configurations wherein the fast pass platform and offer generator can track and store offers, conditions, and rewards for users in a database, the fast pass platform can learn which type of offers are accepted at what frequencies for a specific user or for an average user at what times. For example, a $25 flight credit might be sufficient for a $U_G$ to reschedule for personal travel, but if the travel is for business reasons, the condition of rescheduling might always be refused by $U_G$. However, $U_G$ might accept an offer wherein the $U_G$ just needs to arrive early.

Figure 22:
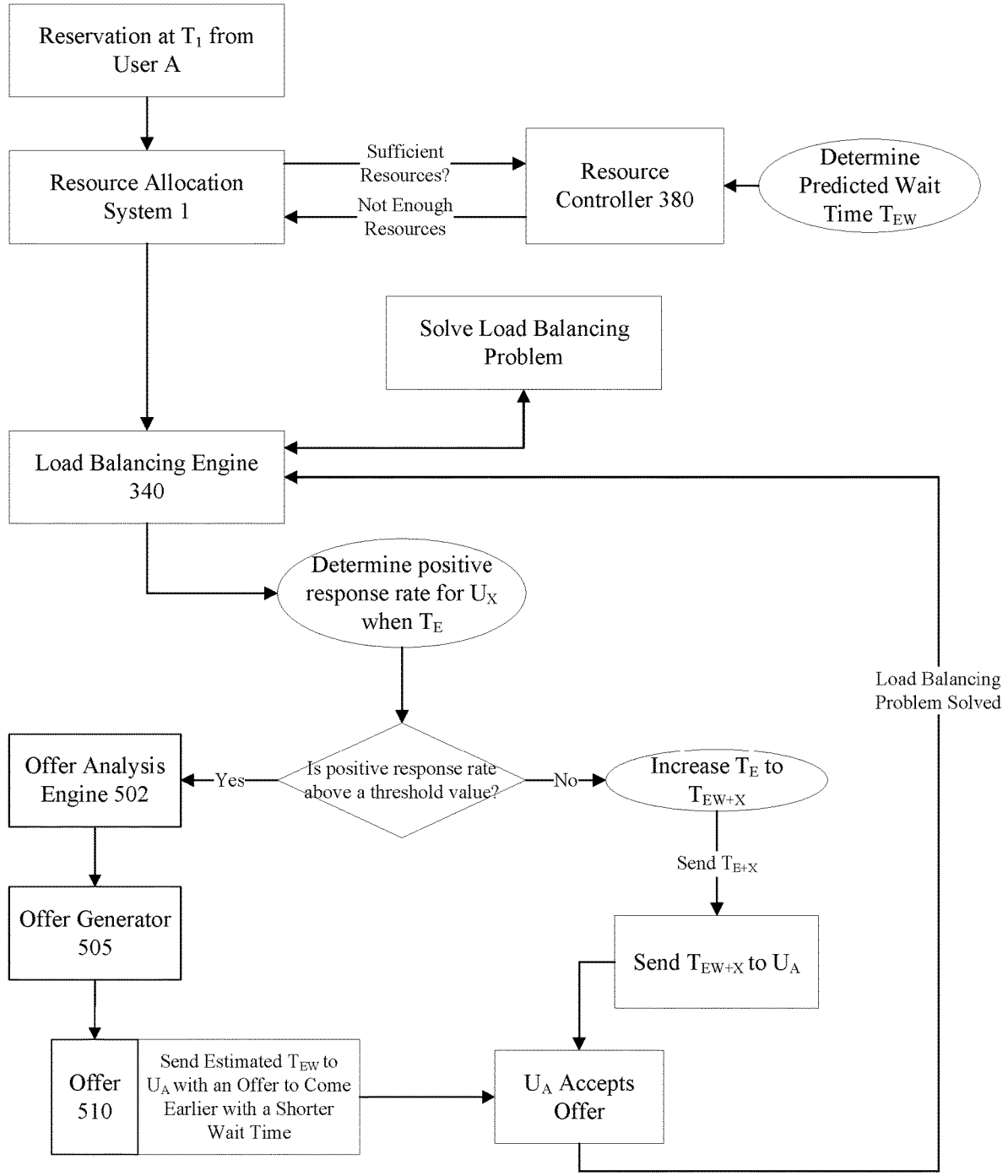
FIG. 22 illustrates a second process flow of the load balancing engine determining a solution to a load balancing problem.

FIG. 22 shows a logic flow for the load balancing engine 340. The load balancing engine may determine an expected cost of having a performance requirement out of compliance (e.g., where $T_{EW}$ is greater than $T_V$ by 5 minutes). The fast pass platform 500 may be configured to generate an offer wherein the benefit is less than the expected cost. In such configurations, the offer analysis engine 502 of the fast pass platform may be configured to calculate both a cost of the benefit and an expected value of a positive decision to the offer. The offer analysis engine 502 may be programmed compare the cost of the benefit and the expected value of accepting the offer. The offer generator 505 may invoke the offer analysis engine to determine whether the expected value of acceptance of the offer is greater than the cost of the benefit before generating the offer or transmitting the offer to the user.

The offer to the user may contain instructions to the user on how to accept, counter, or decline the offer. For example, the offer could contain instructions for the user to click a button, place a phone call to a specific number, interact with an app, or reply to an SMS message. The fast pass platform 500 may be configured to adjust the user's account 550 in response to the decision made by the user. The user account 550 may store offers, benefits obtained from accepting offers, and results which indicated whether the user accepted a specific offer or not.

The fast pass platform 500 may be configured to utilize wait time information $T_{WT}$ when generating an offer. Wait time information may include information about a projected wait time $T_{EW}$ (wait time estimate) if the user shows up early, shows up at a scheduled time $T_S$, shows up on time $T_O$, shows up at a predicted time $T_P$, or shows up late $T_L$. Early, scheduled time, predicted time, and late may be configured for the particular user $U_X$ based on previous experiences with that user (e.g., user $U_A$ usually shows up "late," but $U_B$ generally shows up on time.) Early, scheduled, on time, predicted time, and late may be based on an average time that an average user $U_{average}$ (or specific user $U_X$) arrives at a location. For example, most people arrive 15 minutes early for a movie. The fast pass platform may set a default average time to be 15 minutes early. The fast pass platform may record actual arrival times of system users. The fast pass platform 500 may calculate average arrival times of users of the system.

The fast pass platform 500 may adjust 585 wait time estimates $T_{EW}$ to bias users to take a desired action. The fast pass platform 500 may be configured to generate a predicted wait time $T_{EW}$ of N minutes if user $U_A$ arrived M minutes early (N and M are amount of time such as 10 minutes or 20.5 minutes). The fast pass platform 500 may be configured to determine an acceptance rate $A_R$ of the user (average acceptance of a plurality of users) based on the predicted wait time $T_{EW}$. The fast pass platform 500 may be configured to determine a predicted wait time $T_{EW(X)}$ of the user (or the average user) if no offer 510 is sent. The fast pass platform 500 may be configured to calculate an adjusted wait time $T_{aw}$ if an offer 510 is sent to one or more users.

The fast pass platform 500 may calculate how many users should be sent an offer in order so that the adjusted wait time $T_{AW}$ is below a threshold value $T_V$. $T_V$ may be set by the fast pass platform 500 via a manager or administrator. The threshold value $T_V$ may have a default value, it may be programmed by the manager or administrator, it may be set by the user, or it might be set by the fast pass platform in response to a user satisfaction survey.

The fast pass platform 500 may generate a manufactured wait time ($T_{EW+X}$), wherein X is additional time. A manufactured wait time is a length of time, start time, or end time that is different than the actual or predicted wait time. The manufactured wait time may be shorter or longer than the predicted wait time $T_{EW}$ or the actual wait time $T_{AW}$. As discussed previously, $T_{EW}$ may be the predicted wait time, start time or end time of event generated by the prediction engine. Whereas actual wait time $T_{AW}$ is the amount of time (or actual start time, end time) for an event to occur. $T_V$ may be a threshold value (performance requirement) that may be established by the resource allocation system and/or the load balance engine.

As an example, consider the amount of time a passenger needs to wait in a security line to have his or her baggage screened. The resource allocation system 1 can generate a predicted wait time $T_{EW}$ of 20 minutes at 6 pm Jun. 1, 2024. The resource allocation system 1 can generate a manufactured wait time $T_{EW+X}$ of 35 minutes at 6 pm Jun. 1, 2024 (meaning X=15). The actual wait time $T_{AW}$ at Jun. 1, 2024 could be 17 minutes. The threshold value $T_V$ for the wait time could be 18 minutes. In such an example, the resource controller 380 may determine that the estimated wait time $T_{EW} > T_V$ and alert the resource allocation system. The resource allocation system 1 could invoke the load balancing engine 340 to determine a solution to bring the estimated wait time below the $T_V$. The load balance engine 340 could determine that if it programs the fast pass platform 500 to send a first offer to $U_A$, $U_A$ will not likely take any action. For example, the first offer may inform $U_A$ that if he arrives at 6 pm on Jun. 1, 2024 (the first time), his estimated wait time ($T_{EW}$) would be 20 minutes. Whereas if the fast pass platform 500 informs user A than his predicted wait time is $T_{EW+X}$, then $U_A$ will adjust his arrival time. The fast pass platform 500 may contain intelligence/logic that recognizes that if it sends offers to X users about this long wait time $T_{EW+X}$ (35 minutes) and informs the X users that if he or she arrives at 5:30 pm (a second time) instead of 6:00 pm (the first time), the second estimated wait time for the N users is only 10 minutes. The load balancing engine may be configured to determine X−N users would change their travel plans (arrive at the second time, 5:30 pm) in order to reduce their actual estimated wait time $T_{EW}$ by 25 minutes.

In many cases, wait times in environments (airports, restaurants, parks, lobbies, etc.) are generated when more users (customers) want to use a service, terminal, gain entry, gain access, exit than there are resources (staff, terminals, machines) to service users based on the inflow rate of the users, the number of resources, and the length of time required to provide the service. So, there could be a zero-minute wait time at 5 pm at a screening terminal in airport because resources are sufficient to manage passenger inflow rate, but at 7 pm there is a 30 minute wait time. If the fast pass platform were configured to inform X users that the estimated wait time will be 60 minutes, X−N users may adjust their arrival time to avoid this wait, especially if the X−N users are informed that the estimated wait time at 5 pm is zero minutes.

In other configurations, the fast pass platform 500 might provide the X users with a different offer. The offer could be a discount on a future flight if the user arrives at screening by a second time (5 pm Monday), a free coffee on the flight, a free meal in an airport restaurant, etc. The logic within the load balancing engine may be configured to balance many different possible outcomes and determine which offer will generate a desired outcome at the lowest cost to the operators of the resource allocation system 1. Similarly, the load balancing engine can also generate confidence intervals regarding its generated offers. In such configurations, the load balancing engine 340 may be configured to select an offer that has a highest probability of being successful as compared to other offers. Such configurations may contain thresholds or caps on variables (scheduled time ($T_S$) must be within 30 minutes of $T_{EW}$, a gift for adjusting arrival time must be less than $20, etc.)

Traffic Switch

Figure 23:
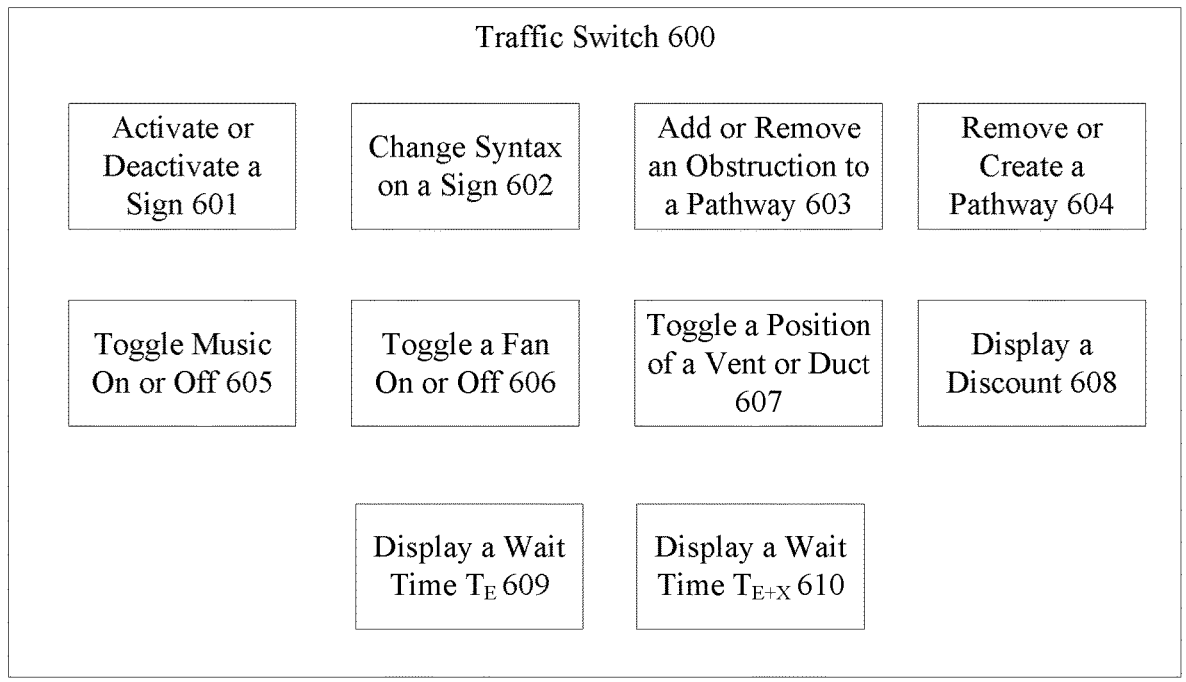
FIG. 23 illustrates a schematic diagram of the traffic switch.

FIG. 23, the system may comprise a traffic switch 600. A traffic switch may be configured to direct, block, influence, or restrict users from travelling to a certain location. The traffic switch may be configured to activate (position, illuminate, open, insert, etc.) a sign to travel a certain direction or to a specific location 601. The traffic switch may be configured to deactivate (position, turn-of, close, remove, etc.) a sign to travel a certain way; turn off a sign to travel to a specific location 601. The traffic switch may be configured to adjust wording, fonts, font size, font spacing, legibility on a sign 602. The traffic switch may be configured to open or remove physical access to a destination 603. The traffic switch may be configured to create a path or shortcut to a destination; block a path or make it the path longer 604. The traffic switch may be configured to toggle music on or off 605. The traffic switch may be configured to toggle a fan on or off 606. The traffic switch may be configured to toggle a position of a vent or duct to, for example, blow specific air particles or gases in the direction of a user 607. The traffic switch may be configured to display a discount or special deal 608; e.g., direct pizza odors via a duct into a corridor leading to a food court; display a discount or special offer at the location). The traffic switch may be configured to make access less desirable to a location through certain destination (display an expected wait time at a specific wait time 609; display an exaggerated wait time at a specific location 610.

Sample Configurations

Figure 24:
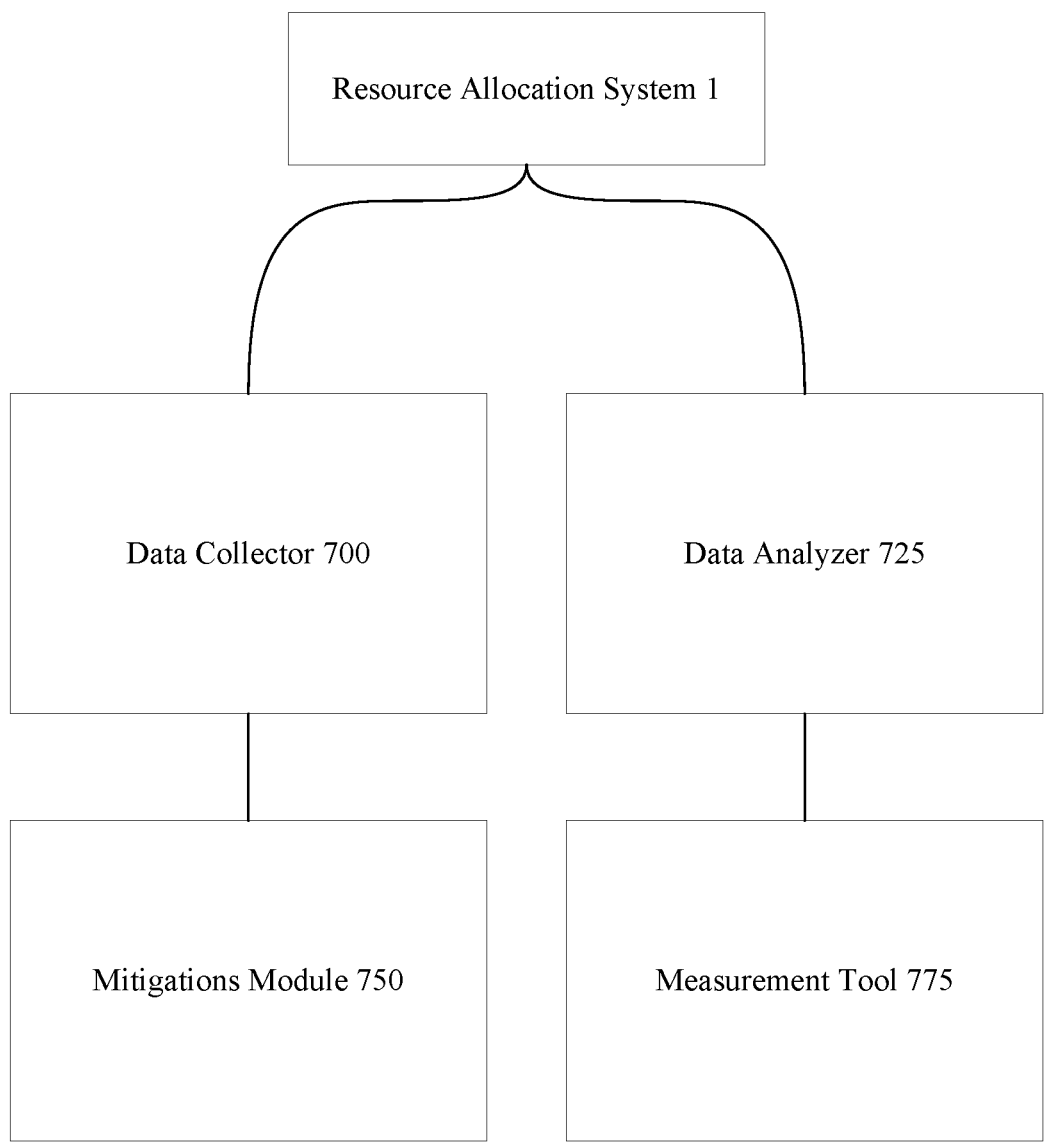
FIG. 24 illustrates a schematic diagram of the resource allocation system.

FIG. 24 illustrates a high level abstract view of a configuration of the resource allocation system 1. Generally, the system may comprise: a data collector 700 for collecting data; a data analyzer 725 for analyzing the data; a mitigations module 750 for taking corrective action; and a measurement tool 775 for determining of users and/or objects.

I) Data Collector

The data collector (such as interface 10) may collect data such as: time of year
Proximity to holidays
Seasonal school breaks
Historical flight volume information
Historical secondary search information
Historical checkpoint/checked baggage throughput information
Time of day
Projected/actual weather conditions at departure location
Projected/actual weather conditions at flight destinations
Scheduled flight departures
Flight departure delay information
Flight departure cancelation information such as reason for flight cancelation (i.e. weather/flight staff/mechanical)
Secure flight passenger booking volume by flight including passenger age information, passenger gender information, passenger precheck status.
Departure location
Destination
Events at destination
Airline
Local Traffic Conditions for high volume driving paths to the airport
Local Weather conditions
Airline data on passenger mobile check-in pre-payment for checked luggage
Available screening staff by gender, skill level for various positions, performance restrictions
Historical call-off information for individual staff members such as proximity to scheduled AL or RDO; proximity to national/local events; or proximity to holidays
Real Time workforce human performance data II) Data Analyzer The data analyzer (such as load balancing engine 340, equipment controller 400, prediction engine 100, and/or resource controller 380) may be configured to use information from the data collector to generate data analytics. Data analytics may include:
Volume of passengers
Projected volume of checked baggage
Arrival distribution of passengers
Arrival distribution of checked baggage
Projected checkpoint property searches
Projected passenger on-person searches
Projected availability of scheduled staff
Projected flight delays
Projected flight cancelations
Projected redistribution/rebooking of passenger on canceled flights to other scheduled flights
Projected "Day of" bookings
Projected passenger/baggage volume scenarios with probabilities of occurrence III) Mitigations Module Based on the data analytics from the data analyzer, the mitigation module (such as staffing module 420, traffic switch 600, equipment controller 400, pricing engine 650) may be configured to take corrective action. Corrective action may include:
Rescheduling of staff to different locations Rescheduling of staff to different shift times
Scheduling/solicitation of staff overtime
Scheduling/solicitation of staff RDO adjustments
Automated scheduling/rescheduling of staff break times
Automated scheduling/rescheduling of staff positions during peak periods IV) Measurement Tool The measurement tool may be configured to take measurements. The measurement tool such as (sensors 130, equipment controller 400, and resource controller 380) may include measuring number of users, data use, service times or durations, number of objects at a location, number of objections in a location in a time window, etc. Measurements of passengers and baggage may include quantitative and qualitative measurements in real time or historical records. Quantitative measurements may include an amount and distribution of passengers and/or baggage entering a screening system. Qualitative measurements may include a speed and alarm rate of the passenger or baggage being scanned. The measurement tool may measure workforce output and users both in historical and real time applications.

CONCLUSION

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing system" encompasses all apparatus, devices, and machines for processing data, including by way of example a programmable processor, a computer, or multiple processors or computers. The system may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Embodiments and functional operations described in this specification may be implemented in digital electronic circuitry, or in computer software, firmware, or hardware, including the structures disclosed in this specification and their structural equivalents, or in combinations of one or more of them. For example, elements designated as engines, generators, identifiers, tools, analyzers, calculators, classifiers, checkers, finders, logic recorders, visualizers, aggregators, modules, nodes, managers, organizers, algorithms, etc. may be implemented in a variety of ways. A computer program (also known as a program, software, software application, script, or code) may be written in any form of programming language, including compiled or interpreted languages, and it may be deployed in any form, including as a standalone program or as a module, component, subroutine, or other unit suitable for use in a computing environment.

A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Figure 25:
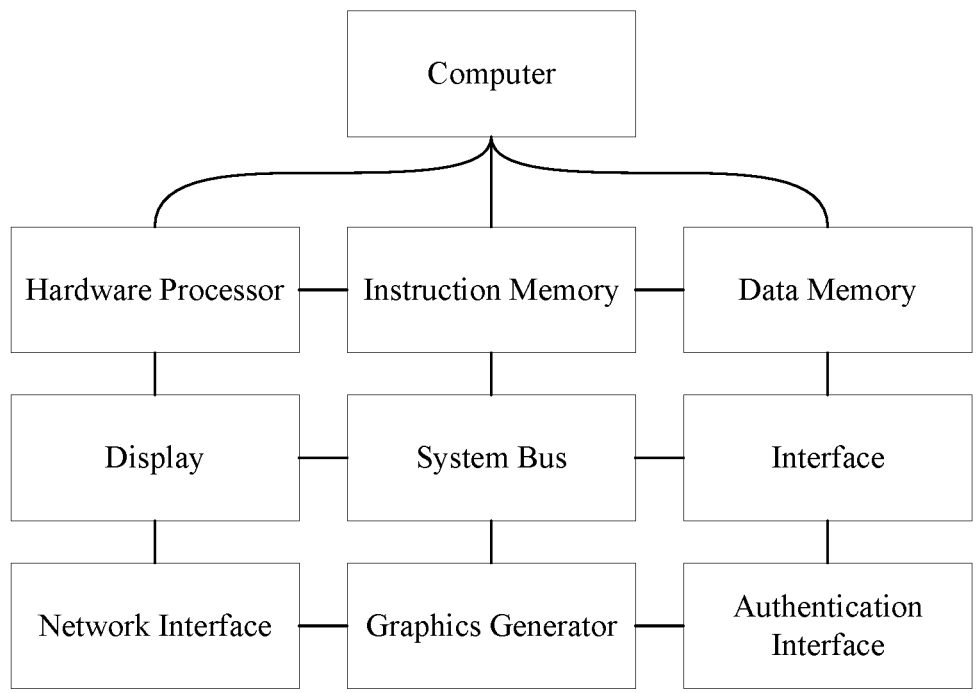
FIG. 25 is hardware diagram of the resource allocation system illustrating an exemplary hardware profile for the resource allocation system.

FIG. 25 illustrates a basic schematic diagram of a computer. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide interaction with a user, embodiments may be implemented on a computer having a display device, like a TV or monitor (CRT or LCD, etc.) for displaying information to the user. Computers may have peripherals like a keyboard, trackpad, mouse, etc. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computer and/or computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

Computer System

FIG. 25 illustrates, in simplified schematic form, a computer on which aspects of the present disclosure can be practiced. The computer can include a hardware processor communicatively coupled to an instruction memory and to a data memory. The instruction memory can be configured to store, on at least a non-transitory computer-readable storage medium as described in greater detail below, executable program code. The hardware processor may include multiple hardware processors and/or multiple processor cores. The hardware processor may include hardware processors from different devices that cooperate. The computer system may execute one or more basic instructions included in the memory executable program code in instruction memory.

Relationship Between Hardware Processor and Executable Program Code

The relationship between the executable program code in the instruction memory and the hardware processor is structural; the executable program code is provided to the hardware processor by imparting various voltages at certain times across certain electrical connections, in accordance with binary values in the executable program code, to cause the hardware processor to perform some action, as now explained in more detail.

A hardware processor may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions. Stated differently, the executable program code can embody or functionality of instructions that cause a computer, e.g., that cause the processor, to perform particular operations or processes.

A computer-readable medium may be transitory or non-transitory. A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Considerations

For any computer-implemented embodiment, "means plus function" elements will use the term "means;" the terms "logic" and "module" have the meaning ascribed to them above and are not to be construed as generic means. An interpretation under 35 U.S.C. § 112 (f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

The various subtitles in the application are inserted to assist the Office in navigation of the application only. The titles should not be considered limited in anyway and should be considered when interpreting the scope of any claim elements. Details on any particular claim element may appear in sections of the application not specifically noted by an associated title.

The claimed subject matter is:

1. A resource allocation system deployable at a first location associated with security scanning; the resource allocation system comprising:
   a traffic switch that selectively blocks a physical access path by users to the first location, and selectively opens the physical access path by users to the first location;
   an X-Ray machine security scanner having an adjustable level of scanning precision associated with a corresponding scanning time;
   an equipment controller that adjusts the level of scanning precision of the X-Ray machine security scanner to affect the corresponding scanning time, and instructs the traffic switch to selectively block or open the physical access path;
   a computer containing a processor, memory and non-transitory computer readable code stored in the memory and configured to cause the processor to execute a series of instructions;
   a prediction engine configured to make a prediction concerning how much time a particular service requires to complete; the prediction having a predicted timing data;
   a history module configured to store service records about an event; the event having event timing data;
   a comparison engine configured to determine whether the predicted timing data is within a predetermined tolerance of the event timing data;
   a service improvement module configured to:
      use the prediction of the prediction engine to generate a recommendation;
      weigh various service improvement factors;
      generate the recommendation to reduce customer wait time based on the predicted timing data; and
   the resource allocation system configured to implement the recommendation by instructing a load balancing engine to determine a solution to a load balancing problem; said solution including instructing the equipment controller to control the traffic switch to physically open the physical access path for users to travel to the first location, and to physically control the X-Ray machine security scanner to decrease scanning precision to decrease wait time, responsive to the recommendation to reduce customer wait time.

2. The resource allocation system of claim 1 wherein the history module is further configured to store in service records:
   a start time and completion time of the event; and
   an arrival time of community travel vessels, departure time of community travel vessels, and wait times for users of the system on a particular date, time, and address; wherein community travel vessels include: buses, trains, planes, and ships; and
   an arrival time of personal travel vessels, departure time of the personal travel vessels.

3. The resource allocation system of claim 1 wherein the prediction engine comprises a prediction accuracy improvement logic configured to:
   generate a prediction based on a feedback loop of events that transpired; and
   update a prediction algorithm based on comparisons between the service records and predictions.

4. The resource allocation system of claim 1 comprising an error range adjustment logic configured to adjust an error range for the prediction engine.

5. The resource allocation system of claim 1, further comprising:
   the prediction engine configured to:
      store prediction records containing prediction information including a news type;
      generate a first prediction about a service; and
   a current events module configured to:
      obtain news information about a news event from a news source;
      classify the news event by news type with a news classifier;
      determine the news type to be a first news type;
      access the prediction records from the prediction engine for predictions for services having the first news type;
      access the service records from the history module for services having the first news type;
      generate a service impact based on differences between the prediction records and the service records for the first news type; the service impact indicating an impact to performance of the resource allocation system; and
      send the service impact to the prediction engine.

6. The resource allocation system of claim 1 comprising a staffing module configured to:
   determine staffing needs for the first location at a particular time;

deploy staff to the first location; and
direct staff to perform a particular operation.

7. The resource allocation system of claim 1 comprising a weather module configured to:
determine weather conditions at the first location; and
adjust the prediction based on the weather conditions.

8. The resource allocation system of claim 1 comprising a valuation module configured to calculate costs for a failure to meet a performance requirement.

9. The resource allocation system of claim 1 comprising a confidence interval adjustment logic configured to store demands on staff, space or equipment resources.

10. The resource allocation system of claim 1, wherein the equipment controller is configured to evaluate an equipment demand amount for the first location comprising one or more terminals.

11. The resource allocation system of claim 1 comprising a pricing engine configured to adjust pricing of a particular service based on feedback from a resource controller.

12. The resource allocation system of claim 1 comprising a space analysis module configured to change store layouts, adjust access pathways, and activate kiosks.

13. A method for optimizing allocation of resources associated with security scanning, comprising:
deploying a resource allocation system at a first location; the resource allocation system:
selectively providing a physical access route for users to the first location with a traffic switch;
scanning with an X-Ray machine security scanner having an adjustable level of scanning precision associated with a corresponding scanning time;
adjusting the level of scanning precision for the X-Ray machine security scanner associated with the corresponding scanning time using an equipment controller;
instructing, by the equipment controller, the traffic switch to selectively control the physical access route;
executing a series of instructions with a computer containing a processor, memory and non-transitory computer readable code stored in the memory;
making a prediction with a prediction engine of how much time a particular service requires to complete, the prediction having predicted timing data stored in the memory;
storing service records in a history module about an event, the event having event timing data stored in the memory;
determining whether the predicted timing data is within a predetermined tolerance of the event timing with a comparison engine;
generating a recommendation result with a service improvement module using the prediction of the prediction engine;
weighing various service improvement factors stored in memory with the service improvement module;
generating the recommendation result to optimize user wait time based on the predicted timing data; and
implementing the recommendation result by instructing a load balancing engine to determine a solution to a load balancing problem, the solution including instructing the equipment controller to control the traffic switch to open the physical access route for users to travel to the first location, and to control the X-Ray machine security scanner to control scanning precision to optimize user wait time, responsive to the recommendation result.

14. The method of claim 13 wherein the history module stores:
a start time and completion time of the event; and
an arrival time of community travel vessels, departure time of community travel vessels, and wait times for users of the system on a particular date, time, and address; wherein community travel vessels include at least one of: buses, trains, planes, and ships.

15. The method of claim 13 comprising:
a prediction accuracy improvement logic generating a prediction based on a feedback loop of events that transpired; and
the prediction accuracy improvement logic updating a prediction algorithm based on comparisons between the service records and predictions.

16. The method of claim 13 comprising an error range adjustment logic adjusting an error range for the prediction engine.

17. The method of claim 13 comprising a current events module obtaining news information and adjust the prediction based on the news information.

18. The method of claim 13 comprising:
a staffing module determining staffing needs for the first location at a particular time;
the staffing module deploying staff to the first location; and
the staffing module directing staff to perform a particular operation.

19. The method of claim 13 comprising:
a weather module determining weather conditions at the first location; and
the weather module adjusting the prediction based on the weather conditions.

20. The method of claim 13 comprising a valuation module calculating costs for a failure to meet a performance requirement.

21. The method of claim 13 comprising a confidence interval adjustment logic storing demands on staff, space or equipment resources.

22. The method of claim 13, further comprising the equipment controller evaluating an equipment demand amount for the first location comprising one or more terminals.

23. The method of claim 13 comprising a pricing engine adjusting pricing of a particular service based on feedback from a resource controller.

24. The method of claim 13 comprising a space analysis module changing store layouts, adjust access pathways, and activate kiosks.

25. The system of claim 1 wherein the prediction comprises:
how much time will be required for a service, action, or an event to be provided or completed;
what time a service deliverable, action, or event will occur;
how much a customer will enjoy or dislike a service;
how much supplies or inventory will be needed for a service, action, or event; and
an arrival and departure time of a travel vessel; shopping duration; and a user wait time.

26. The resource allocation system of claim 1 wherein the history module is configured to store a customer satisfaction report about how much a customer enjoyed a service.

27. The resource allocation system of claim 1 wherein the comparison engine is configured to compare a predicted customer satisfaction record against an actual customer satisfaction record to determine whether they are the same, within a predetermined tolerance, or whether a difference between their values is below a predetermined threshold.

28. A resource allocation system deployable at a first location associated with security scanning; the resource allocation system comprising:
- a traffic switch that selectively blocks a physical access path by users to the first location, and selectively opens the physical access path by users to the first location;
- an X-Ray machine security scanner having an adjustable level of scanning precision associated with a corresponding scanning time;
- an equipment controller that adjusts the level of scanning precision of the X-Ray machine security scanner to affect the corresponding scanning time, and instructs the traffic switch to selectively block or open the physical access path;
- a computer containing a processor, memory and non-transitory computer readable code stored in the memory and configured to cause the processor to execute a series of instructions;
- a prediction engine configured to make a prediction concerning how much time a particular service requires to complete; the prediction having a predicted timing data;
- a history module configured to store service records about an event; the event having event timing data;
- a comparison engine configured to determine whether the predicted timing data is within a predetermined tolerance of the event timing data;
- a service improvement module configured to use the prediction of the prediction engine to generate a recommendation;
- a load balancing engine configured to determine a solution to a load balancing problem;
- said solution including an instruction to the traffic switch to open the physical access path for users to travel to a certain location;
- the equipment controller configured to determine a current customer wait time and to physically control the X-Ray machine security scanner to decrease scanning precision to decrease wait time, responsive to the current customer wait time exceeding a threshold value $T_v$;
- a resource controller configured to determine an expected wait time at the first location exceeds the threshold value $T_v$;
- a fast pass platform configured to:
    - send a notification to a customer that a first expected wait time when the customer comes at an earlier time will be fewer minutes than a second expected wait time when the customer comes at a currently reserved time;
    - send a request to change a customer reservation time to an earlier time in exchange for an incentive;
    - receive a positive response from the customer in exchange for the incentive; and
- the resource allocation system configured to provide the incentive to the customer and adjust the customer reservation time.

29. The system of claim 28 wherein:
the service improvement module is configured to:
- weigh various service improvement factors;
- generate the recommendation to reduce customer wait time based on the prediction timing data; and the resource allocation system is configured to implement the recommendation.

30. The system of claim 29 wherein the service improvement factors are selected from a list consisting of: cost, customer satisfaction, customer irritation, staffing cost, staffing irritation, staffing satisfaction, results certainty, and past offers.

* * * * *